(12) United States Patent
Kim et al.

(10) Patent No.: US 11,339,872 B2
(45) Date of Patent: May 24, 2022

(54) LEVER TYPE VEHICULAR REMOTE SHIFT SWITCHING DEVICE

(71) Applicant: LS Automotive Technologies Co., Ltd., Ansan-si (KR)

(72) Inventors: Jong Hun Kim, Suwon-si (KR); Ki Nyeong Ko, Seoul (KR)

(73) Assignee: LS Automotive Technologies Co., Ltd., Ansan-si (KR)

( * ) Notice: Subject to any disclaimer, the term of this patent is extended or adjusted under 35 U.S.C. 154(b) by 0 days.

(21) Appl. No.: 16/817,549

(22) Filed: Mar. 12, 2020

(65) Prior Publication Data

US 2020/0292064 A1    Sep. 17, 2020

(30) Foreign Application Priority Data

Mar. 15, 2019    (KR) .......................... 10-2019-0029919

(51) Int. Cl.
*F16H 59/04*  (2006.01)
*F16H 59/12*  (2006.01)
*F16H 59/10*  (2006.01)

(52) U.S. Cl.
CPC ........... *F16H 59/12* (2013.01); *F16H 59/044* (2013.01); *F16H 59/105* (2013.01)

(58) Field of Classification Search
CPC ............. F16H 2059/081; F16H 59/044; F16H 59/105; F16H 59/10; F16H 59/12; H01H 25/065; B60R 16/027; B60Q 1/1469; B60K 20/06
See application file for complete search history.

(56) References Cited

U.S. PATENT DOCUMENTS

| | | | | | |
|---|---|---|---|---|---|
| 5,156,243 | A | * | 10/1992 | Aoki | B60K 37/06 192/218 |
| 5,442,974 | A | * | 8/1995 | Sugimoto | B60K 37/06 74/335 |
| 5,453,588 | A | * | 9/1995 | DuRocher | B60Q 1/1476 200/61.27 |
| 5,473,809 | A | * | 12/1995 | DuRocher | B60Q 1/1476 200/61.54 |

(Continued)

FOREIGN PATENT DOCUMENTS

| | | |
|---|---|---|
| JP | 2003-162943 A | 6/2003 |
| JP | 2011-090501 A | 5/2011 |

*Primary Examiner* — Jake Cook
*Assistant Examiner* — Gregory Robert Weber
(74) *Attorney, Agent, or Firm* — Rabin & Berdo, P.C.

(57) ABSTRACT

Provided is a lever type vehicular remote shift switching device. The switching device includes: a lever housing (100) disposed at a steering shaft of a vehicle; a lever substrate (200) disposed within the lever housing (100); a lever rotary switch unit (300) at least partially rotatably disposed at an end of the lever housing (100) and comprising a rotary switch part (360) disposed on the lever substrate (200); a lever button switch unit (400) at least partially disposed at an end of the lever rotary switch unit (300) in a movable pressing manner, and including a lever button switch 460 at least partially disposed on the lever substrate (200), wherein the lever button switch unit (400) is at least partially disposed in the longitudinal direction of the lever housing (100) so as to pass through an at least part of the lever rotary switch unit (300).

14 Claims, 13 Drawing Sheets

(56) References Cited

U.S. PATENT DOCUMENTS

| | | | | |
|---|---|---|---|---|
| 5,629,505 | A * | 5/1997 | Cryer | B60Q 1/1476 200/50.32 |
| 8,573,086 | B2 * | 11/2013 | Sano | B60Q 1/1476 74/412 R |
| 10,100,919 | B1 * | 10/2018 | Turney | F16H 59/0278 |
| 11,014,450 | B2 * | 5/2021 | Keenan | B60K 37/06 |
| 2004/0110600 | A1 * | 6/2004 | Sekino | F16H 59/105 477/99 |
| 2009/0231072 | A1 * | 9/2009 | Urakawa | B60Q 1/1476 335/205 |
| 2014/0345409 | A1 * | 11/2014 | Watanabe | F16H 59/08 74/473.3 |

* cited by examiner (A)

(B)

(A)

(B)

(A)

(B)

(A)

(B)

LEVER TYPE VEHICULAR REMOTE SHIFT SWITCHING DEVICE

CROSS-REFERENCE TO RELATED APPLICATIONS

This application claims the benefit of Korean Patent Application No. KR10-2019-0029919, filed on Mar. 15, 2019 in the Korean Intellectual Property Office, which is incorporated herein by reference in its entirety.

BACKGROUND OF THE INVENTION

1. Field of the Invention

The present invention relates to a switch installed in a vehicle, and more particularly, to a vehicular switch which implements a combined operation thereof through a simple and compact structure.

2. Description of Related Art

In general, a steering wheel assembly for vehicles includes a steering wheel, a steering column, a steering roll connector assembly, and a multi-function switch assembly. The steering wheel is intended to allow a driver to set the steering direction. The rotation of the steering wheel by the driver is transferred to vehicle wheels through the steering column so that the steering angle of the vehicle is set. In addition, a vehicle such as an automobile requires functions of various kinds of convenient means for offering a more stable and comfortable driving state, beyond a function of the vehicle as a means of transportation.

For example, the steering wheel of a vehicle which is recently produced includes a window switch for opening or closing a window, a steering light switch for turning on or off a steering light, an audio switch for driving an audio device, and a wiper switch for driving a wiper. The multi-function switch assembly includes a light and a fog lamp, a wiper, various audio devices, and a vehicle window switch, and the like. The multi-functional switch assembly serves to prevent the driver's driving attention from being dissipated even during manipulation of a wide variety of devices by increasing the manipulability of the various devices. The multi-functional switch assembly is implemented as a button switch mounted on a top of the steering wheel, or a vehicular lever switch mounted on a side of the steering wheel. Further, various functions are concentrated on a console switch.

The switch of the vehicle follows a recent trend toward an intensive combination of switches having various functions. The structure of the vehicular switch becomes more complicated in proportion to an increase in functions of the switch, thus leading to an increase in the possibility of erroneous operation of the switch.

In particular, in the case of a simple convenience function of a vehicle as well as an essential function of the vehicle, for example, even in the case of a gearshift lever of changing a gear-shifting range, gear shifting is performed by an electromechanical or electronic switch. Such a switching device entails advantages and disadvantages associated with durability, a feeling of manipulation, or cognition of manipulation according to the feeling of manipulation depending on its type.

However, an emphasis is made on the importance of the durability and the cognition of a manipulation state through a user's manipulation in that the switching device is a vehicular device. A switch structure according to a conventional prior art involves a problem of the excessiveness of a space occupied by components and the inconvenience of manipulation due to a structural constraints.

SUMMARY OF THE INVENTION

Accordingly, the present invention has been made to solve the above-mentioned problems occurring in the prior art, and it is an object of the present invention to provide a lever type vehicular remote shift switching device, which is configured to implement a combined operation thereof through a simple and compact structure so that durability can be enhanced and a more accurate operation can be achieved, and thus reliability of manipulation can be improved while increasing manipulation sensibility or manipulation cognition of a vehicle occupant and accomplishing the minimization of a manipulation space.

To achieve the above objects, in one aspect, the present invention provides a lever type vehicular remote shift switching device configured to be disposed at a side of a steering wheel connected to a steering shaft of a vehicle, the switching device including: a lever housing 100 disposed at the steering shaft; a lever substrate 200 disposed within the lever housing 100; a lever rotary switch unit 300 at least partially rotatably disposed at an end of the lever housing 100 and including a rotary switch part 360 disposed on the lever substrate 200; a lever button switch unit 400 at least partially disposed at an end of the lever rotary switch unit 300 in a movable pressing manner, and including a lever button switch 460 at least partially disposed on the lever substrate 200, wherein the lever button switch unit 400 is at least partially disposed in the longitudinal direction of the lever housing 100 so as to pass through an at least part of the lever rotary switch unit 300.

In the lever type vehicular remote shift switching device, the lever rotary switch unit 300 may include: a rotary knob 310 disposed to be rotatable about an axis in a longitudinal direction of the lever housing 100; a rotary shaft housing support 340 securely fixed to the inside of the lever housing 100; a rotary shaft 320 connected at one end thereof to the rotary knob 310, and rotatably disposed at the other end thereof in the rotary shaft housing support 340 so as to rotate together with the rotary knob 310; a rotary block 330 disposed on an outer circumferential surface of the rotary shaft 320 at the rotary shaft housing support 340 and configured to axially rotate together with the rotary shaft 320; a rotary transfer part 350 disposed within the lever housing 100 at least partially together with an end of the rotary block 330 and configured to transfer the rotation of the rotary block 330; and a rotary switch part 360 including a rotary switch moving part 361 disposed at the rotary transfer part 350 so as to be moved together with the rotary transfer part 350 in response to the movement of the rotary transfer part 350, and a rotary switch fixing part 363 disposed on the lever substrate 200 to correspond to the rotary switch moving part 361 and configured to generate an electric signal changed depending on the rotation of the rotary switch moving part 361.

In the lever type vehicular remote shift switching device, the rotary shaft 320 may include: a rotary shaft support 321 disposed at one end of the rotary shaft 320 so as to be rotatably inserted into the rotary shaft housing support 340; a rotary shaft coupling part 326 rotatably coupled to the rotary knob 310; a rotary shaft body 325 disposed between the rotary shaft support 321 and the rotary shaft coupling part 326; and a rotary shaft block mounting part 323 disposed between the rotary shaft body 325 and the rotary shaft support 321 so as to allow the rotary block 330 to be disposed on an outer circumferential surface thereof.

In the lever type vehicular remote shift switching device, the rotary block 330 may include: a rotary block body 331 including a rotary block body mounting part 332 engageable with the outer circumferential surface of the rotary shaft block mounting part 323; and a rotary block body extension part 333 disposed on an outer circumferential surface of the rotary block body 331 so as to allow the rotary transfer part 350 to be at least partially disposed at least one end thereof.

In the lever type vehicular remote shift switching device, the rotary block body mounting part 332 may be formed as a through-hole structure, wherein the rotary shaft block mounting part 323 includes a rotary shaft block mounting guide 324 formed on an outer circumferential surface thereof, and wherein the rotary block body 331 includes a rotary block body guide 3311 formed on an inner circumferential surface thereof so as to be engageable with the rotary shaft block mounting guide 324.

In the lever type vehicular remote shift switching device, the rotary shaft body 325 may include a rotary shaft body incised part 3251 formed on an outer circumferential surface thereof so as to prevent an interference with an at least part of the lever button switch unit 400.

In the lever type vehicular remote shift switching device, the rotary transfer part 350 may include: a rotary transfer driving part 351 connected to the rotary block 330 so as to be rotated together with the rotary block 330; a rotary transfer driven part 353 operated in cooperation with the rotary transfer driving part 351 so as to receive a rotational driving force from the rotary transfer driving part 351; and a rotary transfer shaft 355 connected to the rotary transfer driven part 353 so as to perform an equiangular rotation together with the rotary transfer driven part 353.

In the lever type vehicular remote shift switching device, the rotary transfer shaft 355 may include: a rotary transfer shaft body 3551 formed extending in the longitudinal direction of a rotational center axis of the rotary transfer driven part 353; a rotary transfer shaft coupling part 3553 disposed at one end of the rotary transfer shaft body 3551 so as to be connected to the rotary transfer driven part 353; and a sensor mounting part 3555 disposed at the other end of the rotary transfer shaft body 3551 so as to allow the rotary switch part 360 to be at least partially disposed therein.

In the lever type vehicular remote shift switching device, the rotary transfer part 350 may further include a rotary transfer shaft holding part 357 disposed so as to be fixed in position with respect to the lever housing 100 so as to guide the rotation of the rotary transfer shaft 355.

In the lever type vehicular remote shift switching device, when projected onto a plane perpendicular to the segments extending in the longitudinal direction of the rotary shaft 320 and the rotary transfer shaft 355, the segments may intersect each other.

In the lever type vehicular remote shift switching device, the rotary transfer driving part 351 and the rotary transfer driven part 353 may form a gear engagement structure in which they are meshedly engaged with each other.

In the lever type vehicular remote shift switching device, the rotary transfer driving part 351 and the rotary transfer driven part 353 may form a gear engagement structure in which a rotational axis of the rotary transfer driving part 351 and a rotational axis of rotary transfer driven part 353 are disposed to intersect each other at right angles.

In the lever type vehicular remote shift switching device, the rotary switch part 360 may be a non-contact switch.

In the lever type vehicular remote shift switching device, the rotary switch moving part 361 may be a magnet, and the rotary switch fixing part 363 may be a magnetic sensor disposed on the lever substrate 200.

In the lever type vehicular remote shift switching device, the lever rotary switch unit 300 may further include a rotary return part 370 configured to allow the rotary shaft 320 and the rotary block 330 to return to their original positions when an external force applied to the rotary knob 310 is removed.

In the lever type vehicular remote shift switching device, the rotary return part 370 may include: a rotary return accommodating part 371 configured to be disposed so as to be fixed in position with respect to the lever housing 100; a rotary return detent block 375 at least partially movably accommodated in the rotary return accommodating part 371; a rotary return elastic part 373 contacted at one thereof with the inside of the rotary return accommodating part 371 and contacted at the other end thereof with one end of the rotary return detent block 375 so as to elastically support the rotary return detent block 375; and a rotary return detent 377 disposed at the rotary block 330 and configured to maintain a constant contact state with the other end of the rotary return detent block 375.

In the lever type vehicular remote shift switching device, the lever button switch unit 400 may include: a lever button knob 410 disposed in a movable pressing manner in an axial longitudinal direction of the lever housing 100; a lever button linear block 420 coupled at one end thereof to the lever button knob 410 and configured to be rectilinearly moved in the longitudinal direction of the lever housing 100; a lever button holder 440 disposed at the lever housing 100; a lever button switch movement transfer part 450 rotatably disposed at at least one part thereof in the lever button holder 440 and configured to be contactable at at least the other part thereof with the lever button linear block 420; and a lever button switch 460 disposed to be contactable with the lever button switch movement transfer part 450 so as to generate an electrical signal by the lever button switch movement transfer part 450.

In the lever type vehicular remote shift switching device, the lever button switch movement transfer part 450 may include: a lever button switch movement transfer hinge 451 rotatably coupled to the lever button holder 440; a lever button switch movement transfer trigger contact part 453 disposed at one side of an outer circumference of the lever button switch movement transfer hinge 451 so as to be contactable with lever button linear block 420; and a lever button switch movement transfer trigger moving part 455 disposed at the other side of the outer circumference of the lever button switch movement transfer hinge 451 so as to operate the lever button switch 460.

In the lever type vehicular remote shift switching device, the lever button switch movement transfer trigger contact part 453 may include: a lever button switch movement transfer trigger contact body 4531 connected to the lever button switch movement transfer hinge 451 so as to extend outwardly from the lever button switch movement transfer hinge 451; and a lever button switch movement transfer trigger contact hook 4533 formed extending outwardly from an end of the lever button switch movement transfer trigger contact body 4531.

In the lever type vehicular remote shift switching device, when projected onto a plane including a rectilinear direction where the lever button linear block 42 is moved, a distance (lh) between the lever button switch movement transfer trigger contact hook 4533 and the lever button switch movement transfer hinge 451, and a distance (lp) between a position of the lever button switch movement transfer trigger moving part 455, where the lever button switch 460 is operated and the lever button switch movement transfer hinge 451 may form a preset distance ratio (Rph=lp/lh).

In the lever type vehicular remote shift switching device, the lever button switch movement transfer trigger contact hook 4533 may be disposed extending toward the lever button switch movement transfer hinge 451 when projected onto a plane including a rectilinear direction where the lever button linear block 420 is moved.

In the lever type vehicular remote shift switching device, the lever button switch movement transfer trigger moving part 455 may include: a transfer trigger moving body 4551 disposed at the other side of the outer circumference of the lever button switch movement transfer hinge 451; and a transfer trigger moving base 4553 disposed at an end of the transfer trigger moving body 4551 and configured to operate the lever button switch 460.

In the lever type vehicular remote shift switching device, the lever button switch 460 may include a rubber pad switch.

In the lever type vehicular remote shift switching device, the lever button switch unit 400 may further include a lever button linear block guide 430 disposed so as to be fixed in position with respect to the lever substrate 200, and configured to guide the movement of the lever button linear block 420.

In the lever type vehicular remote shift switching device, the lever button linear block guide 430 may include: a linear block guide body 431 disposed so as to be fixed in position with respect to the lever housing 100 and configured to be engaged with the lever button linear block 420 to enable a relative movement between the linear block guide body 431 and the lever button linear block 420; and a linear block guide line 435 formed on the linear block guide body 431 in a relative movement direction of the lever button linear block 420, wherein the lever button linear block 420 may include a linear block body accommodating guide 4213 formed on an inner circumference thereof so as to be engageable with the linear block guide line 435.

In the lever type vehicular remote shift switching device, the linear block guide line 435 may be formed on an outer circumference of the linear block guide body 431.

In the lever type vehicular remote shift switching device, the lever button linear block guide 430 may include a linear block guide body through-hole 433 formed on an inner circumference thereof so as to penetrate through the linear block guide body 431.

In the lever type vehicular remote shift switching device, the lever button linear block guide 430 may be formed integrally with the lever button holder 440.

In the lever type vehicular remote shift switching device, the lever button linear block 420 may include: a linear block body 421 coupled to the lever button knob 410 so as to be rectilinearly moved; and a linear block trigger 423 coupled to the linear block body 421 and configured to transfer a movement force to the lever button switch movement transfer part 450.

In the lever type vehicular remote shift switching device, the linear block trigger 423 may be formed in a direction perpendicular to a movable direction of the linear block body 421, and may include a linear block trigger body 4231 brought into direct contact with the lever button switch movement transfer part 450.

Effects of the Invention

The lever type vehicular remote shift switching device according to the present invention can implement a shift-by-wire function of a shift lever device for a vehicle and enhance manipulation reliability and durability.

In addition, the lever type vehicular remote shift switching device according to the present invention can integrate a lever rotary switching function and a lever button switching function, and enable a compact configuration through a position or direction of the flow of manipulation.

Further, the lever type vehicular remote shift switching device according to the present invention can minimize the number of elements, increase a degree of freedom of design, and improve assemblability, leading to a reduction in the manufacturing cost.

Besides, the lever type vehicular remote shift switching device according to the present invention can minimize a mounting space through a compact configuration owing to the use of a single substrate or a structure of preventing interference in the arrangement region of a lever rotary/lever button operation. In addition, the possibility of an erroneous operation due to interference between elements can be prevented or minimized.

Further, the lever type vehicular remote shift switching device according to the present invention enables formation of the ratio between the strokes of the rotary knob and the rotary switch manipulated actually through the transfer structure of the rotary switch unit to implement a large switching operation with a small manipulation stroke, thereby ensuring reliability of manipulation.

In addition, the lever type vehicular remote shift switching device according to the present invention has been described centering on a shift lever switch structure for implementing a shift-by-wire function of a shift lever device, but it is obvious that the operating structure of the lever rotary and button switch can be applied to the implementation of various switching functions for a vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENTS

Figure 1:
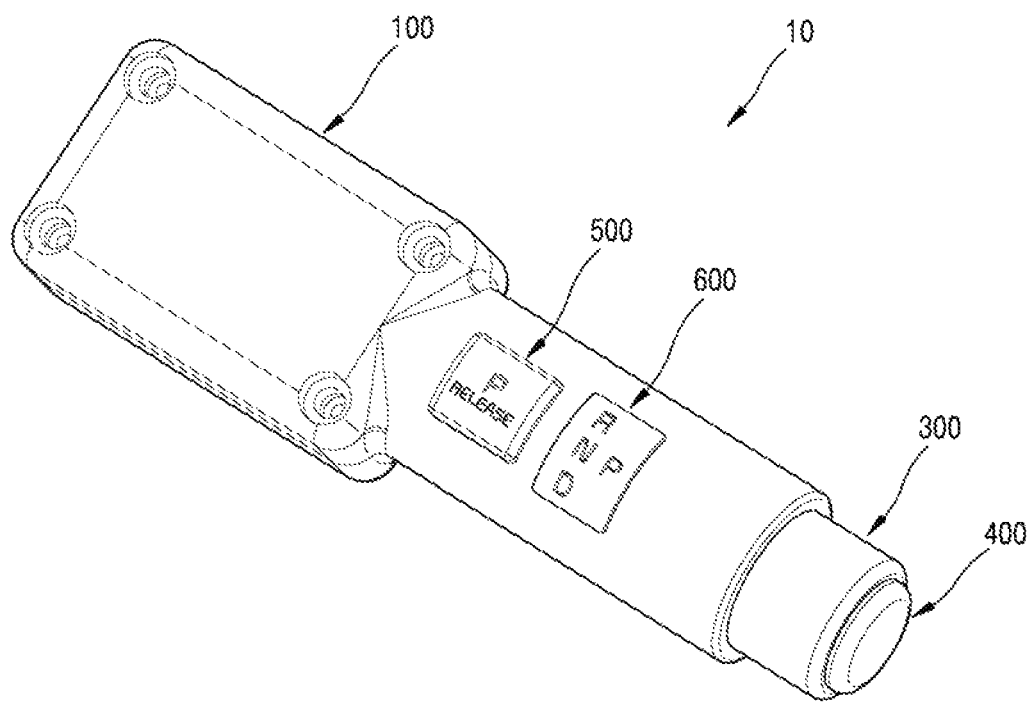
FIG. 1 is a schematic perspective view showing a lever type vehicular remote shift switching device according to an embodiment of the present invention.

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

A lever type vehicular remote shift switching device 10 of the present invention is a switching device. In particular, a description is made centering on the case where a shift device for a vehicle is implemented as a switching device for realizing a shift-by-wire function of changing a gear shifting state of a vehicle using an electric signal, deviating from a direct physical operation scheme through physical connection in a specific embodiment of the present invention, but the scope of the present invention is not limited thereto and the shift device can be utilized variously as an constituent element for implementing various switching operations of an apparatus, particularly a vehicle.

The lever type vehicular remote shift switching device 10 of the present invention is configured to be disposed at a side of a steering wheel connected to a steering shaft of a vehicle. The lever type vehicular remote shift switching device 10 of the present invention includes a lever housing 100, a lever substrate 200, a lever rotary switch unit 300, and a lever button switch unit 400.

The lever housing 100 is disposed at the steering shaft. More specifically, the lever housing 100 is formed extending radially outwardly from the steering shaft (not shown).

The lever housing 100 includes a housing base 110, a housing cover 120, and a housing medium 130. The housing medium 130 은 is interposed between the housing base 110 and the housing cover 120.

Figure 2:
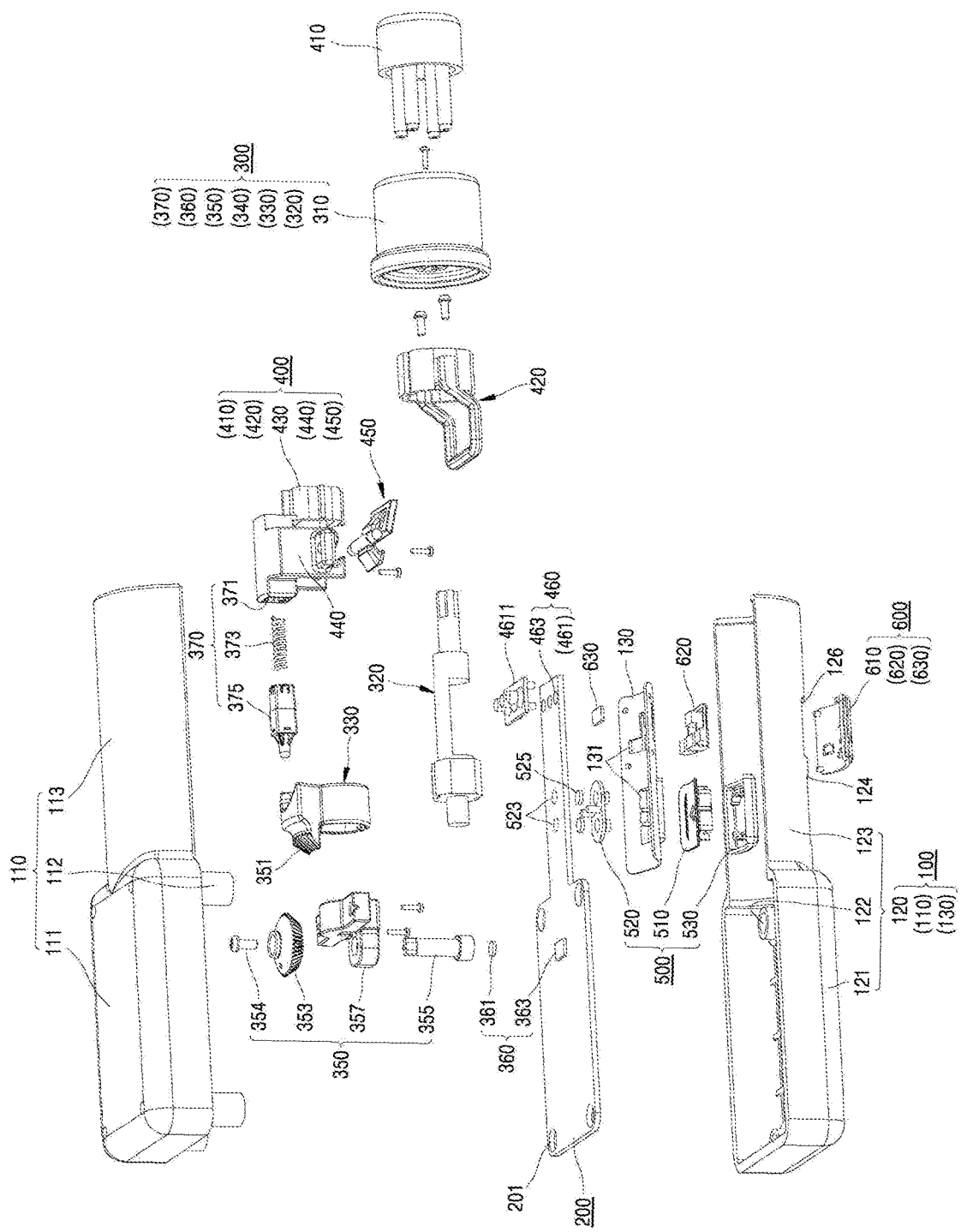
FIG. 2 is a schematic exploded perspective view showing a lever type vehicular remote shift switching device according to an embodiment of the present invention.
Figure 3:
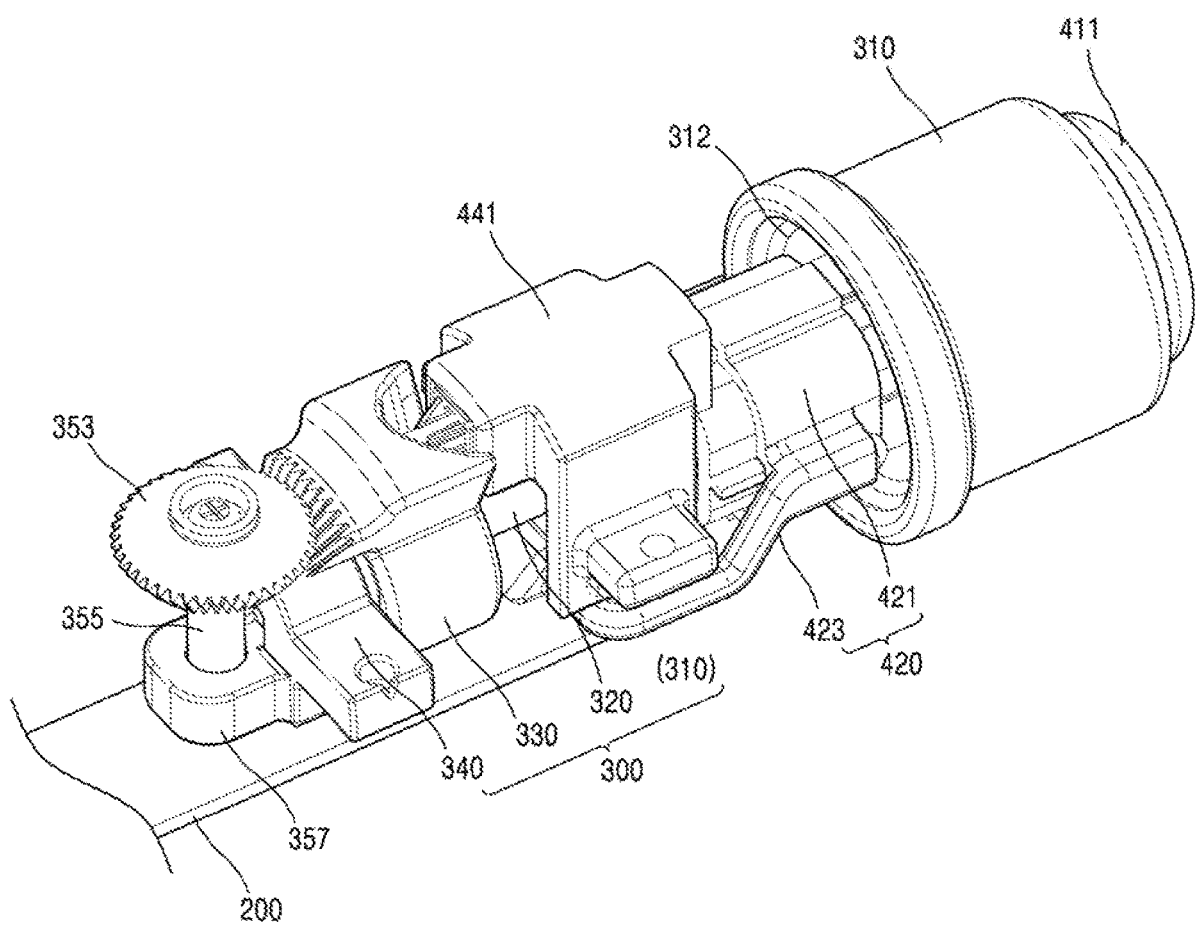
FIGS. 3 and 4 are schematic partial perspective and side views showing a lever type vehicular remote shift switching device according to an embodiment of the present invention.
Figure 4:
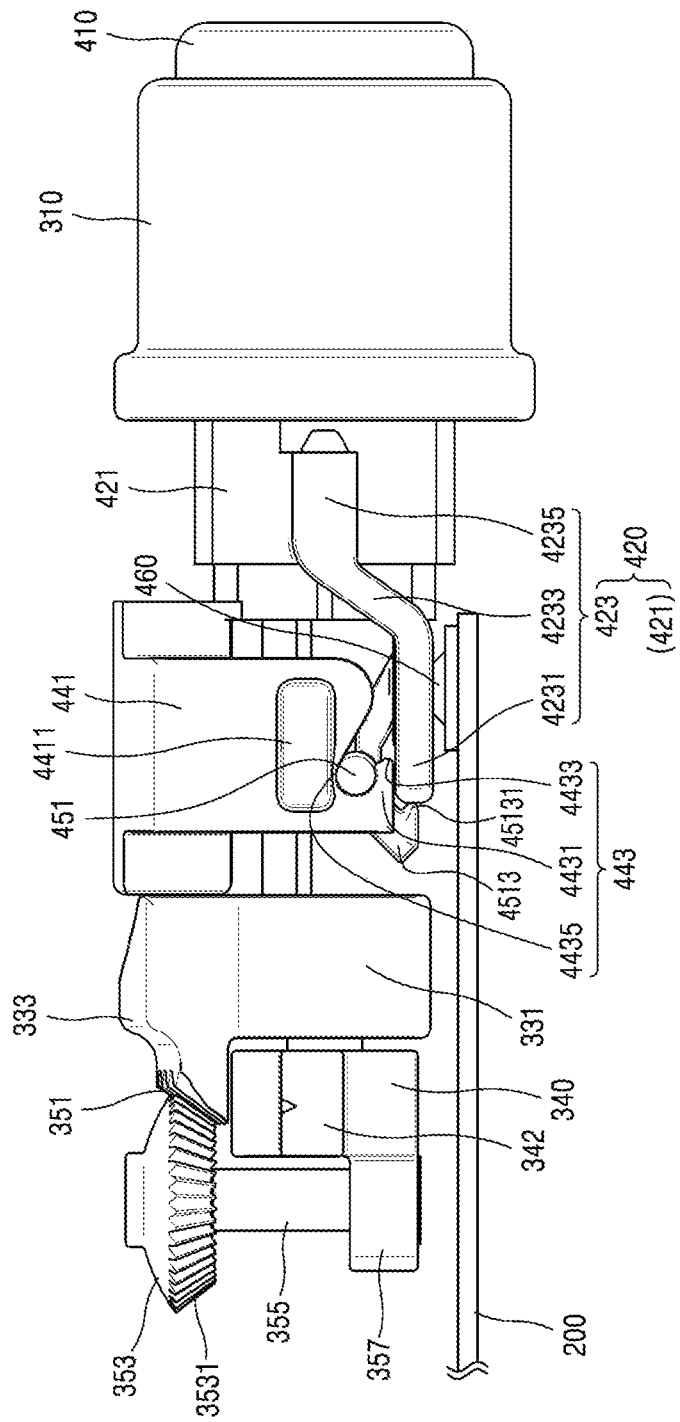
Figure 5:
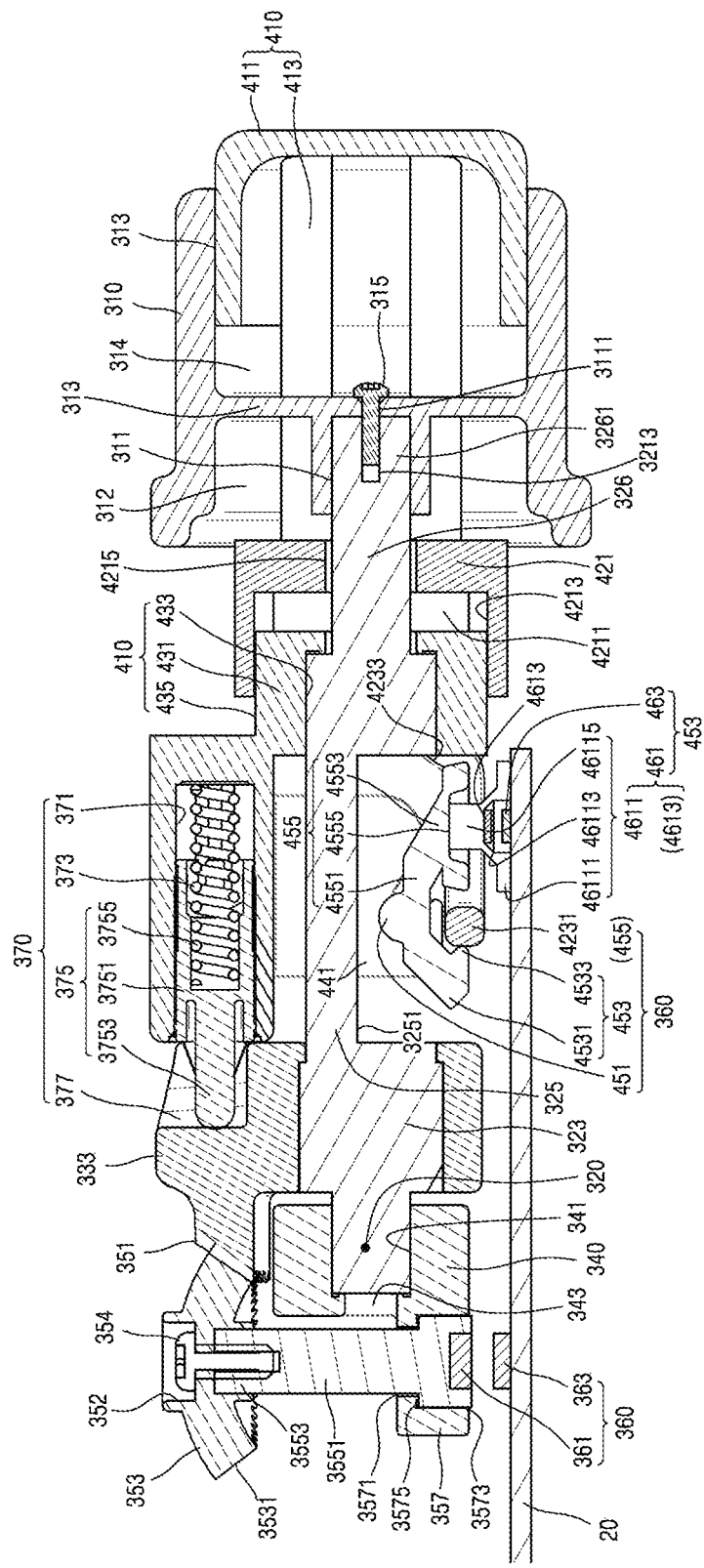
FIG. 5 is a schematic partial side cross-sectional view showing a lever type vehicular remote shift switching device according to an embodiment of the present invention.
Figure 6:
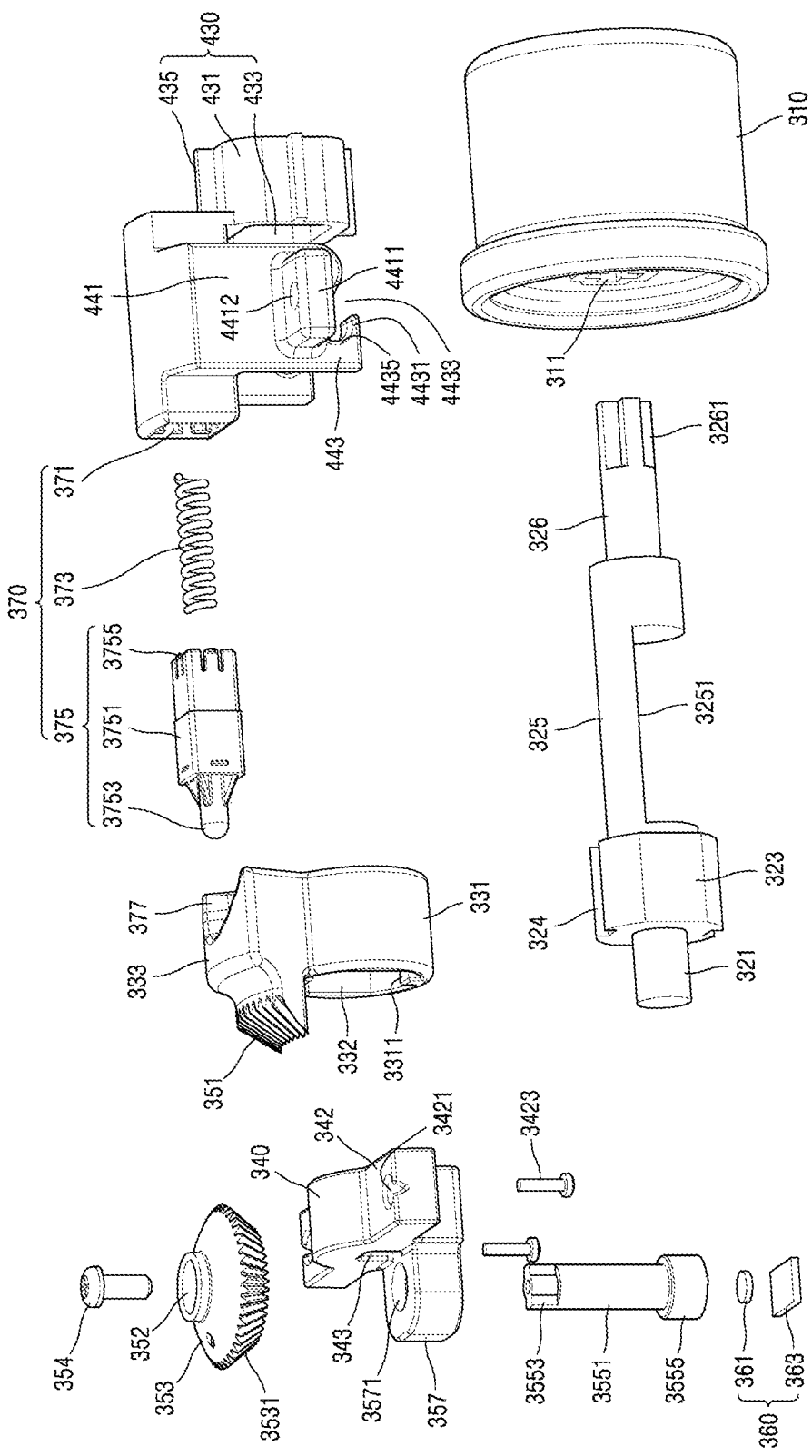
FIG. 6 is a schematic partial exploded perspective view showing a lever rotary switch unit of a lever type vehicular remote shift switching device according to an embodiment of the present invention.

The lever type vehicular remote shift switching device 10 has been shown in an upside-down shape at 180 degrees in FIG. 2 to facilitate the understanding of the invention through clear illustration of the elements of the lever rotary switch unit and the lever button switch unit shown in FIG. 1, but the present invention is not limited thereto.

As shown in FIGS. 1 and 2, the housing cover 120 is an element implemented as a lever type housing, and includes a cover body 121 and a cover shaft 123. The cover body 121 and the cover shaft 123 may be formed integrally with each other, and may have a configuration in which they are formed as separate elements and coupled to each other.

The cover body 121 may include a cover body rib for reinforcing the rigidity at the inside thereof, and the cover shaft 123 formed integrally with the cover body 121 has a configuration in which it is formed in a semi-cylindrical shape in this embodiment.

The cover shaft 123 has a cover shaft button through-opening 124 and a cover shaft indicator through-opening 126, which are formed on an outer circumferential surface thereof, so that a push switch unit 500 and an indicator 600 are disposed in the cover shaft button through-opening 124 and the cover shaft indicator through-opening 126 so as to be outwardly exposed, respectively.

A housing medium 130 is disposed between the housing cover 120 and the housing base 110 in such a manner as to be intersectingly disposed in the cover shaft button through-opening 124 and the cover shaft indicator through-opening 126 so that the housing medium 130 can cover an internal space defined between the housing cover 120 and the housing base 110 to prevent the introduction of external foreign substances into the interspace.

The other end of the cover shaft 123 has an opening structure to enable the arrangement and smooth operation of the lever rotary switch unit 300 and the lever button switch unit 400, which will be described later.

The housing base 110 is disposed so as to confront to the housing cover 120. Similarly to the housing cover 120, the housing base 110 includes a base body 111 and a base shaft 113, which are respectively disposed so as to be engaged with the cover body 121 and the cover shaft 123.

A base body connection part 112 is disposed at the inside of the base body 111 so that an engagement fastening between the housing base 110 and the housing cover 120 can be strengthened.

The lever substrate 200 is disposed within the lever housing 100, specifically in the internal space defined between the housing cover 120 and the housing base 110. The lever substrate 200 is implemented as a printed circuit board, and may be entirely or at least partially implemented as a flexible printed circuit board in some embodiments.

The lever substrate 200 is electrically connected to an external electrical device such as, for example, a control unit (not shown) for a vehicle so that the transfer of a change in a signal manipulated by a user can be smoothly performed and a power supply function can be performed through its electrical connection with an external power supply.

The lever substrate 200 may have a configuration in which a rotary switch part 360 of the lever rotary switch unit 300, a lever button switch 460 of the lever button switch unit 400, a push switch unit 500, and an indicator 600, which will be described later, are at least partially disposed on the lever substrate 200 to establish an electrical communication.

The lever rotary switch unit 300 is an element that performs a switching function through a rotation manipulation about a rotational center axis of a longitudinal direction of the lever housing 100. The lever rotary switch unit 300 of the present invention includes a rotary switch part 360 disposed on the lever substrate 200. The lever rotary switch unit 300 is disposed at least partially rotatably disposed at an end of the lever housing 100.

The lever rotary switch unit 300 includes a rotary knob 310, a rotary shaft housing support 340, a rotary shaft 320, a rotary block 330, a rotary transfer part 350, and a rotary switch part 360.

The rotary knob 310 is an element that is manipulated by a user, and is disposed to be rotatable about an axis in a longitudinal direction of the lever housing 100. In other words, as shown in FIGS. 1 to 5, the rotary knob 310 is formed in a ring or disc shape having a predetermined through-hole formed at the center thereof so as to be disposed at the other ends of the housing cover 120 and the housing base 110. A rotary knob coupling part 311 is disposed inwardly from one end of the rotary knob 310 so as to be directed toward the lever housing 100. The rotary knob coupling part 311 has a structure of being coupled to a rotary shaft coupling part 326 which will be described later.

The rotary knob 310 includes a rotary knob rib 313 formed therein, a rotary knob shaft space part 312 formed therein to allow an end of the lever housing 100 to be disposed in the rotary knob shaft space part 312, and a rotary knob button space part 314 formed therein to allow a button switch knob 410 of the lever button switch unit 400 to be disposed in the rotary knob button space part 314. In this case, the rotary knob shaft space part 312 and the rotary knob button space part 314 are spatially separated from each other with the rotary knob rib 313 interposed therebetween.

A rotary knob coupling mounting hole 3111 is formed in the rotary knob rib 313 to allow the rotary knob shaft space part 312 and the rotary knob button space part 314 to fluidically communicate with each other.

The rotary shaft housing support 340 is securely fixed to the inside of the lever housing 100. The rotary shaft housing support 340 performs a function of a holder and journal bearing for the rotary shaft 320, which carries out the rotation of the rotary shaft 320 and supports the rotary shaft 320 which will be described later. Although it has been described in this embodiment that the rotary shaft housing support 340 is a separate element fixedly mounted to the lever housing 100, it can be modified in various manners within a range of rotatably supporting an end of the rotary shaft 320, such as having a configuration in which the rotary shaft housing support 340 is formed integrally with the lever housing 100 or is formed in a flat shape, but not an arch shape. In this embodiment, a description will be made centering on the case where the rotary shaft housing support 340 is implemented as a separate element fixedly mounted to the lever housing 100.

The rotary shaft housing support 340 forms a predetermined block structure in which it has a rotary shaft housing support fixing part 342 formed extending to both sides from the central portion of the rotary shaft housing support 340 so as to securely fix the rotary shaft housing support 340 to the inside of the lever housing 100 in this embodiment. In this embodiment, the rotary shaft housing support fixing part 342 is formed extending to both sides of the rotary shaft housing support 340, i.e., in a perpendicular direction to a longitudinal direction of the rotary shaft 320. Each of the rotary shaft housing support fixing parts 342 has a supporting fixing mounting part 3421 formed therein, and a support fixing member 3423 is inserted through the support fixing mounting part 3421 and then is engagingly mounted to the lever housing 100, more specifically, the inside of the housing base 110, so that the rotary shaft housing support 340 forms a stable position fixing structure with respect to the lever housing 100.

The rotary shaft housing support 340 forms a predetermined block structure in such a manner that it includes a rotary shaft housing support accommodating part 341 (see FIG. 5) formed therein as an insertable recess or through-hole in the longitudinal direction of the rotary shaft 320. One end of the rotary shaft 320 is rotatably inserted into the rotary shaft housing support accommodating part 341. In this embodiment, the rotary shaft housing support accommodating part 341 is implemented as an accommodating recess, but the configuration of the present invention is not limited thereto.

In some embodiments, for example, like the case where the rotary shaft housing support accommodating part 341 is implemented as an accommodating recess, the rotary shaft housing support 340 may further include a rotary shaft housing support through-hole 343 formed therein so as to fluidically communicate with the rotary shaft housing support accommodating part 341. When the rotary shaft housing support through-hole 343 fluidically communicates with the rotary shaft housing support accommodating part 341 to allow one end of the rotary shaft 320 to be received in the rotary shaft housing support accommodating part 341, a grease inside is prevented from leaking out of the rotary shaft housing support 340 by being pushed by air or a problem is solved in that an insertion and mounting operation is not smoothly operated in the assembly process, by virtue of a closed end of the rotary shaft housing support accommodating part 341.

The rotary shaft 320 is connected at one end thereof to the rotary knob 310, and is inserted at the other end thereof into the rotary shaft housing support accommodating part 341 of the rotary shaft housing support 340 as described above so as to be disposed rotatably relative to the lever housing 100. Although it has been illustrated and described in this embodiment that the rotary shaft 320 is directly connected to the rotary knob 310, it is obvious that the lever rotary switch unit 300 may have a configuration in which it further includes a separate connecting element for transferring the rotate state of the rotary knob 310 to the rotary shaft 320. In this embodiment, a description will be made centering on the case where the other end of the rotary shaft 320 is directly connected to the rotary knob 310.

The rotary shaft 320 is connected to the rotary knob 310 disposed at the ends of the cover 120 and the housing base 110 so as to rotate together with the rotary knob 310.

The rotary shaft 320 has a rod type structure having a predetermined length. The rotary shaft 320 according to an embodiment of the present invention includes a rotary shaft support 321, a rotary shaft coupling part 326, a rotary shaft body 325, and a rotary shaft block mounting part 323.

The rotary shaft support 321 is disposed at one end of the rotary shaft 320 so as to be rotatably inserted into the rotary shaft housing support 340 as mentioned above. By virtue of this structure, the rotary shaft support 321 may form a coupling structure movable relative to the rotary shaft housing support 340 to implement a predetermined support structure. The rod type rotary shaft 320 may form a stable, rotatable support structure through a penetration structure of a lever button linear block 420 of the lever button switch unit 400, a support structure of the ever button linear block 420 and a lever button linear block guide 430, and a structure having another support point inside the lever housing 100, along with a support point at the rotary shaft housing support 340 through the rotary shaft support 321 lever button switch unit 400 which will be described later.

The rotary shaft coupling part 326 is disposed at the rotary knob 310, and is rotatably coupled to the rotary knob 310. As described above, the rotary shaft coupling part 326 may have a rotation state transfer structure achieved through a separate element besides a structure in which the rotary shaft coupling part 326 is directly coupled to the rotary knob 310. In this embodiment, a description is made centering on the case where the rotary shaft coupling part 326 and the rotary knob 310 are directly coupled to each other to integrally rotate together with each other, but the coupling structure between the rotary shaft coupling part 326 and the rotary knob 310 is not limited thereto.

The rotary shaft coupling part 326 includes a rotary shaft coupling spline 3261 formed on an outer circumferential surface of a distal end thereof so as to form an engagement structure of restricting a relative rotation between the rotary shaft coupling part 326 and the rotary shaft coupling spline 3261. As described above, the rotary knob rib 313 has a rotary knob coupling mounting hole 3111 formed therein so as to allow the rotary knob shaft space part 312 and the rotary knob button space part 314 to fluidically communicate with each other. The rotary knob shaft fastening member 315 is engagedly fastened to the rotary shaft coupling part 326 through a rotary knob coupling mounting hole 3111 formed as a through-hole in the rotary knob rib 313 so as to be positioned inwardly from the rotary knob coupling part 311 so that an engagement fastening structure can be implemented which restricts a relative rotation between the rotary shaft coupling part 326 of the rotary shaft 320 and the rotary knob 310.

The rotary shaft body 325 is disposed between the rotary shaft support 321 and the rotary shaft coupling part 326. The rotary shaft body 325 may be modified in various manners, such as being implemented as either a simple integral structure in which it is formed integrally with the rotary shaft coupling part 326 or an equiradial cylindrical structure. In this embodiment, the rotary shaft body 325 may have a configuration of preventing rigidity decrease due to the arrangement of a rotary shaft body incised part 3251 on a structure for preventing a torsion due to its rotation or an interference with another element which will be described later by allowing the rotary shaft body 325 to have a radius larger than that of the rotary shaft coupling part 326. In other words, the rotary shaft body 325 includes a rotary shaft body incised part 3251 formed on an outer circumferential surface thereof so as to prevent an interference with an at least part of the lever button switch unit 400. Herein the rotary shaft body incised part 3251 formed longitudinally on the outer circumferential surface of the rotary shaft body 325 refers to an incised space or an inner surface defining the incised space. The rotary shaft body incised part 3251 forms a space where the lever button switch movement transfer part 450 of the lever button switch unit 400 and an at least part of the lever button linear block 420 are movable so that an interference can be prevented from occurring between the lever button switch unit 400 and the rotary shaft body 325.

The rotary shaft block mounting part 323 is disposed between the rotary shaft body 325 and the rotary shaft support 321 so as to allow the rotary block 330 to be disposed on an outer circumferential surface thereof. In this embodiment, although the rotary shaft block mounting part 323 has a configuration of having an effective radius larger than a radius of the rotary shaft coupling part 326, this is merely an example and is not limited thereto.

The rotary shaft block mounting part 323 according to this embodiment may have a square-shaped structure so as to prevent an unwanted relative rotation between the rotary block 330 mounted thereon and the rotary shaft block mounting part 323, ultimately the rotary shaft 320.

The rotary shaft block mounting part 323 has a pair of opposed rotary shaft block mounting guides 324 formed on an outer circumferential surface thereof so as to further strengthen the smooth insertion of the rotary shaft block mounting part 323 into the rotary block 330 and the prevention of a relative rotation between the rotary shaft block mounting part 323 and the rotary block 330. In addition, the rotary block 330 has a pair of opposed rotary block body guides 3311 formed on an inner circumferential surface thereof to correspond to the positions of the rotary shaft block mounting guides 324. In this embodiment, the rotary shaft block mounting guide 324 and the rotary block body guide 3311 are formed as a rectilinear structure having a predetermined length.

The rotary block 330 is disposed on an outer circumferential surface of the rotary shaft 320 at the rotary shaft housing support 340 and axially rotates together with the rotary shaft 320. The rotary block 330 according to an embodiment of the present invention includes a rotary block body 331 and a rotary block body extension part 333.

The rotary block body 331 includes a rotary block body mounting part 332. The rotary block body mounting part 332 has a structure in which it is engageable with the outer circumferential surface of the rotary shaft block mounting part 323. In other words, the rotary block body 331 includes the rotary block body mounting part 332 of a through-hole structure. The rotary block body mounting part 332 is formed as the through-hole structure so that the rotary block body 331 has a topological ring structure. In other words, by virtue of this structure, the rotary shaft block mounting part 323 of the rotary shaft 320 is insertedly mounted to the rotary block body mounting part 332 so as to restrict a relative rotation between the rotary shaft 320 and the rotary block 330 so that when the rotary shaft 320 is rotated, the rotary block body 331 is coaxially rotated about the rotary shaft 320 together with the rotary shaft 320. The rotary block 330 mounted on the outer circumference of the rotary shaft 320 has a radius of gyration larger than that of the rotary shaft 320 at a position where the rotary block 330 is mounted on the rotary shaft 320.

In addition, as described above, the rotary block body guide 3311 is disposed in the rotary block body mounting part 332 formed as the through-hole structure. In other words, the rotary shaft block mounting guide 324 is formed on the outer circumferential surface of the rotary shaft block mounting part 323, and the rotary block body 331 includes the rotary block body guide 3311. The rotary block body guide 3311 is formed on the inner circumferential surface of the rotary block body 331 so as to be engageable with the rotary shaft block mounting guide 324.

The rotary block 330 includes the rotary block body extension part 333. The rotary block body extension part 333 is disposed on the outer circumference of the rotary block body 331, and allows the rotary transfer part 350 to be at least partially disposed at at least one end thereof.

The rotary block body extension part 333 permits the at least partial arrangement of other elements which will be described later, for example, the transfer part 350 and/or a rotary return part 370 to allow the other elements to be rotated together with the rotary block body 331.

In the meantime, the rotary transfer part 350 is disposed within the lever housing 100 in such a manner as to be disposed at least partially together with an end of the rotary block 330, i.e., to be connected to an end of the rotary block 330, and is rotated together with the rotary block 330 to transfer the rotation of the rotary block 330.

More specifically, the rotary transfer part 350 may include a rotary transfer driving part 351, a rotary transfer driven part 353, and a rotary transfer shaft 355.

The rotary transfer driving part 351 is connected to the rotary block 330 so as to be rotated together with the rotary block 330. In this embodiment, the rotary transfer driving part 351 is disposed at a side of the rotary block body extension part 333 of the rotary block 330 so as to be directed toward a plane perpendicular to a rotational axis of the rotary shaft 320. The rotary transfer driving part 351 is formed in an arcuate shape on the outer circumference of the rotary block body extension part 333.

In this embodiment, the rotary transfer driving part 351 and the rotary transfer driven part 353 form a gear engagement structure in which they are meshedly engaged with each other, but the structure of the present invention is not limited thereto and can be modified variously, such as implementing a pulley structure. In this embodiment, a description will be made centering on the case where the rotary transfer driving part 351 and the rotary transfer driven part 353 is formed as the gear engagement structure.

In this embodiment, the rotary transfer driven part 353 is operated in cooperation with the rotary transfer driving part 351 so as to receive a rotational driving force from the rotary transfer driving part 351. The rotary transfer driven part 353 is formed as a toothed gear element having a teeth array formed on the outer circumference thereof. When the rotary transfer driven part 353 is meshed engaged with the rotary transfer driving part 351 and then the rotary shaft 320 is rotated, the rotary transfer driving part 351 formed on the rotary block body extension part 333 is also rotated together with the rotary shaft 320, and the rotary transfer driven part 353 meshed with the rotary transfer driving part 351 is rotated together with the rotary transfer driving part 351 in response to the rotation of the rotary transfer driving part 351.

In this embodiment, the rotary transfer driving part 351 및 rotary transfer driven part 353 form a gear engagement structure in which a rotational axis of the rotary transfer driving part 351 and a rotational axis of rotary transfer driven part 353 are disposed to intersect each other at right angles. Thus, the row of teeth of the rotary transfer driving part 351 is formed in an arcuate shape, but is formed as a bevel gear engagement structure.

By virtue of this configuration, the change of the rotational direction of the rotary transfer driving part 351 and the rotational direction of the rotary transfer driven part 353 can be carried out. In other words, the rotary transfer driving part 351 forms the same axially rotatable structure as that of the rotary shaft 320, but the rotary transfer driven part 353 has a structure in which it is rotated about a rotational axis perpendicular to the rotational axis of the rotary shaft 320 so that a sensing structure having a certain gear ratio can be implemented even under a restriction in a narrow design space.

The rotary transfer driven part 353 includes a rotary transfer driven teeth array 3531 formed on a lower portion thereof so as to extend downwardly from a side circumferential edge thereof so that the rotary transfer driven teeth array 3531 is meshedly engaged with the rotary transfer driving part 351. A rotary transfer driven coupling part 352 is formed on a top of the rotary transfer driven part 353, and a rotary transfer driven fastening part 354 is inserted into the rotary transfer driven coupling part 352 so as to be coupled to a rotary transfer shaft coupling part 3553 formed on an upper end of the rotary transfer shaft 355, so that when the rotary transfer driven part 353 is rotated, the rotary transfer shaft 355 is also rotated together with the rotary transfer driven part 353.

The rotary transfer shaft 355 is connected to the rotary transfer driven part 353 so as to perform an equiangular rotation together with the rotary transfer driven part 353. In other words, the rotary transfer shaft 355 has a rectangular rod structure formed in the longitudinal direction of a rotational axis of the rotary transfer driven part 353

The rotary transfer shaft 355 includes a rotary transfer shaft body 3551, a rotary transfer shaft coupling part 3553, and a sensor mounting part 3555.

The rotary transfer shaft body 3551 is implemented as a rod shape which is formed extending in the longitudinal direction of a rotational center axis of the rotary transfer driven part 353. The rotary transfer shaft coupling part 3553 is disposed at one end of the rotary transfer shaft body 3551 so as to be connected to the rotary transfer driven part 353. In other words, as described above, the rotary transfer driven fastening part 354 is inserted into the rotary transfer driven coupling part 352 formed on the top of the rotary transfer driven part 353, and then is coupled to the rotary transfer shaft coupling part 3553 formed on the upper end of the rotary transfer shaft 355 so that when the rotary transfer driven part 353 is rotated, the rotary transfer shaft 355 is rotated together with the rotary transfer driven part 353.

The sensor mounting part 3555 is disposed at the other end of the rotary transfer shaft body 3551. The sensor mounting part 3555 has an accommodating recess formed on a bottom end thereof, and the rotary switch part 360 is at least partially disposed in the sensor mounting part 3555, so that when the rotary transfer shaft 355 is rotated, the at least part of the rotary switch part 360 is rotated together with the rotary transfer shaft 355. The rotary switch part 360 according to an embodiment of the present invention has a non-contact magnetic sensor structure. In the case where the rotary switch part 360 is implemented as various forms, it may be performed other manners.

Meanwhile, the rotary switch part 360 according to an embodiment of the present invention is implemented a longitudinal rod shape, and the rotary transfer part 350 may further include a configuration for maintaining the rotation of the rotary transfer shaft 355.

In other words, the rotary transfer part 350 may further include a rotary transfer shaft holding part 357 that supports the rotary transfer shaft 355. The rotary transfer shaft holding part 357 is disposed so as to fixed in position with respect to the lever housing 100 so as to guide the rotation of the rotary transfer shaft 355.

In this embodiment, when projected onto a plane including the segments extending in the longitudinal direction of the rotary shaft 320 and the rotary transfer shaft 355, the segments intersect each other. In other words, the plane including the segments extending in the longitudinal direction of the rotary shaft 320 and the rotary transfer shaft 355 refers to a plane such as a drawing sheet of FIG. 5. The segments extending in the longitudinal direction of the rotary shaft 320 and the rotary transfer shaft 355, i.e., the respective lines I-I and II-II are arranged to intersect each other.

Various configurations can be made within a range of implementing such as an intersecting arrangement structure, but the rotary transfer shaft holding part 357 and the rotary shaft housing support 340 may form an integral structure. In this embodiment, the rotary transfer shaft holding part 357 is disposed so as to be fixed in position with respect to the lever housing 100 and is formed integrally with the rotary shaft housing support 340. In other words, the rotary transfer shaft holding part 357 which is a lateral part of the rotary shaft housing support 340 has a structure in which the rotary shaft housing support accommodating part 341 formed in the rotary shaft housing support 340 is formed so that it has a 'L' shape rotated to the left by 90 degrees on the drawing sheet of FIG. 5.

By virtue of such a unified, integral structure, a reduction in the number of constituent elements may involve the assemblability improvement effect.

In the meantime, the rotary switch part 360 includes a rotary switch moving part 361 and a rotary switch fixing part 363.

The rotary switch moving part 361 is disposed at the rotary transfer part 350 so as to be moved together with the rotary transfer part 350 in response to the movement of the rotary transfer part 350.

The rotary switch fixing part 363 is disposed on the lever substrate 200 to correspond to the rotary switch moving part 361 and generates an electric signal changed depending on the rotation of the rotary switch moving part 361. The rotary switch part 360 of the present invention is not limited thereto, but can be modified in various manners depending on design specifications, such as being implemented as a contact type structure or a non-contact type structure other than a magnetic structure.

In this embodiment, a description is made centering on the case where the rotary switch part 360 is implemented as a magnetic sensor switching structure of a non-contact type. In the case where the rotary switch part 360 is a non-contact switch, the rotary switch fixing part 363 is disposed on the lever substrate 200 to correspond to the rotary switch moving part 361 in such a manner that the rotary switch fixing part 363 and the rotary switch moving part 361 are spaced apart from each other. The rotary switch moving part 361 according to this embodiment is a magnet which is fixedly inserted into the sensor mounting part 3555 of the rotary transfer shaft 355.

The rotary switch fixing part 363 is a magnetic sensor disposed on the lever substrate 200. In this embodiment, the rotary switch fixing part 363 serving as the magnetic sensor may be a hall sensor, an ARM sensor, or a GMR sensor for more accurately detecting the rotation state of the rotary switch moving part 361 serving as the magnet, and various non-contact sensors may be selected depending on design specifications.

By virtue of this structure, the rotation of the rotary knob 310 rotates the rotary shaft 320, which in turn rotates the rotary block 330 disposed on the rotary shaft 320 and the rotary transfer part 350 connected to the rotary block 330. Then, a degree of the rotation of the rotary knob 310 or a change in an operating mode selected through the rotary knob 310 can be selectively detected in response to the relative rotation between the rotary switch moving part 361 and the rotary switch fixing part 363 of the rotary switch part 360 disposed in the rotary transfer part 350

In the meantime, the lever rotary switch unit 300 of the present invention may further include a rotary return part 370. The rotary return part 370 allows the rotary shaft 320 and the rotary block 330 to return to their original positions when an external force applied to the rotary knob 310 is removed.

More specifically, the rotary return part 370 includes a rotary return accommodating part 371, a rotary return detent block 375, a rotary return elastic part 373, and a rotary return detent 377.

The rotary return accommodating part 371 is disposed so as to be fixed in position with respect to the lever housing 100. In this embodiment, the rotary return accommodating part 371 has a structure in which it is disposed at a lever button holder 440 of the lever button switch unit 400, but various design modifications thereof can be made within a range of being disposed so as to be fixed in position with respect to the lever housing 100.

The rotary return accommodating part 371 is formed as a recessed structure that can accommodate other elements. The rotary return detent block 375 is at least partially disposed in the rotary return accommodating part 371. In other words, the rotary return detent block 375 is at least partially movably accommodated in the rotary return accommodating part 371. The rotary return detent block 375 includes a detent block body 3751, a detent block body head 3753, and a detent block accommodating part 3755.

The detent block body 3751 is implemented as a block body having a predetermined length. The detent block body head 3753 and the detent block accommodating part 3755 are respectively disposed before and after the detent block body 3751 in terms of a movement direction of detent block body 3751.

The detent block body head 3753 has a structure in which it is contacted with the rotary return detent 377 which will be described later. The detent block body head 3753 is formed in a hemispherical shape having a curved surface so that it can have a movable structure of enabling a smooth contact with the an external element, i.e., the rotary return detent 377.

The detent block accommodating part 3755 is formed at one end of the detent block body 3751 so as to be opposed to the other end of the detent block body 3751, in which the detent block body head 3753 is formed, so as to allow the rotary return elastic part 373 to be at least partially accommodated therein.

The rotary return elastic part 373 can be configured in various manners within a range of providing an elastic force in the longitudinal direction thereof, but is implemented as a coil spring in this embodiment. The rotary return elastic part 373 is accommodated at one end thereof in the rotary return accommodating part 371 and is accommodated at the other end thereof in the detent block accommodating part 3755 so as to be contacted with the inner end surfaces of the detent block accommodating part 3755 and the rotary return accommodating part 371 to elastically support the detent block accommodating part 3755 and the rotary return accommodating part 371.

In other words, the rotary return elastic part 373 is contacted at one thereof with the inside of the rotary return accommodating part 371 and contacted at the other end thereof with one end of the rotary return detent block 375 so as to elastically support the rotary return detent block 375

The rotary return detent 377 is disposed at the rotary block 330 and maintains a constant contact state with the other end of the rotary return detent block 375. In this embodiment, the rotary return detent 377 is disposed at the rotary block body extension part 333 of the rotary block 330. In other words, the rotary transfer driving part 351 is disposed at one side of the rotary block body extension part 333 and the rotary return detent 377 is disposed at the other side of the rotary block body extension part 333.

In FIGS. 11 to 14(A) and 14(B), there is shown an operating process of the lever rotary switch unit 300. First, when a user rotates the rotary knob 310, the rotary shaft 320 connected to the rotary knob 310 forms a rotational state. The rotary shaft 320 is rotatably supported at the other end thereof by the rotary shaft housing support 340 to maintain a stable rotational state, and the rotary block 330 disposed on the rotary shaft 320 is rotated together with the rotary shaft 320. In this case, the rotary transfer driving part 351 of the rotary transfer part 350 is disposed at the rotary block body extension part 333 of the rotary block 330 disposed on the rotary shaft 320, and the rotary transfer driven part 353 disposed at the rotary transfer shaft 355 so as to be operable in cooperation with the rotary transfer driving part 351 is rotated. In this process, a compact element can be arranged while overcoming a spatial restraint through the intersecting arrangement structure of a predetermined rotational axis. When the rotary transfer driven part 353 is rotated, the rotary transfer shaft 355 is also rotated together with the rotary transfer driven part 353, and the rotational state of the rotary switch moving part 361 disposed at the bottom end of the rotary transfer shaft 355 is detected through the rotary switch fixing part 363 disposed to correspond to the rotary switch moving part 361, so that a change in a given electrical signal can be transferred to an external device such as a control unit (not shown), and thus a signal of implementing a predetermined operation, for example, a shift range selection operation or the like can be generated, transferred and outputted.

Also, in the meantime, the lever type vehicular remote shift switching device 10 of the present invention further includes a lever button switch unit 400. In other words, the lever button switch unit 400 is at least partially disposed at an end of the lever rotary switch unit 300 in a movable pressing manner. More specifically, in this embodiment, the lever button switch unit 400 is at least partially disposed at an end of the lever rotary switch unit 300 in a movable pressing manner in the central direction of a steering shaft (not shown) and includes the lever button switch 460 at least partially disposed on the lever substrate 200.

In particular, the lever button switch unit 400 is at least partially disposed in the longitudinal direction of the lever housing 100 so as to pass through an at least part of the lever rotary switch unit 300. In other words, in this embodiment, a lever button knob 410 of the lever button switch unit 400 has a structure in which it is penetratingly disposed at the rotary knob 310 of the lever rotary switch unit 300.

More specifically, the lever button switch unit 400 according to an embodiment of the present invention may include a lever button knob 410, a lever button linear block 420, a lever button holder 440, a lever button switch movement transfer part 450, and a lever button switch 460.

The lever button knob 410 is disposed in a movable pressing manner in an axial longitudinal direction of the lever housing 100. The lever button knob 410 is disposed at the other end of the rotary knob 310 of the lever rotary switch unit 300 so as to be positioned at an end of the lever housing 100. Thus, the lever button knob 410 has a structure in which it is disposed in a movable pressing manner in the longitudinal direction of the lever housing 100, more specifically in the longitudinal direction of the rotary shaft 320 of the lever rotary switch unit 300.

The lever button knob 410 includes a lever button knob body 411 and a lever button knob coupling part 413. The lever button knob body 411 has a predetermined cap structure and is disposed at an outer end of the rotary knob 310, and the lever button knob coupling part 413 is connected to an inner end of the lever button knob body 411 so that it can be connected to the lever button linear block 420 to form a stable support structure of the lever button knob body 411.

The lever button linear block 420 is coupled at one end thereof to the lever button knob 410 and configured to be rectilinearly moved in the longitudinal direction of the lever housing 100. In other words, when the lever button linear block 420 is coupled to the lever button knob 410 and the lever button knob 410 is moved, the lever button linear block 420 is also moved rectilinearly together with the lever button knob 410. The lever button linear block 420 includes a linear block body 421 and a linear block trigger 423.

The linear block body 421 is coupled to the lever button knob 410 so as to be rectilinearly moved. In this embodiment, the linear block body 421 has a rounded square-shaped linear block structure, but is not limited thereto and various modifications thereof can be made.

The linear block body 421 is implemented as a block type structure. A linear block body accommodating part 4211 is disposed at the other side opposite to one side where the lever button knob 410 is disposed, and a linear block body accommodating guide 4213 is formed on the inner surface of the linear block body accommodating part 421. In addition, the lever button linear block guide 430 is accommodatingly disposed in the linear block body accommodating part 4211, and the lever button linear block guide 430 and the linear block body accommodating guide 4213 will be described later.

The linear block body 421 includes a linear block body shaft through-hole 4215 so that the rotary shaft 320 can be penetratingly disposed through the linear block body shaft through-hole 4215.

The linear block trigger 423 is coupled to the linear block body 421 and configured to transfer a movement force to the lever button switch movement transfer part 450. The linear block trigger 423 is formed in a direction perpendicular to a movable direction of the linear block body 421. The linear block trigger 423 includes a linear block trigger body 4231. The linear block trigger body 4231 is brought into direct contact with the lever button switch movement transfer part 450.

In this embodiment, the linear block trigger body 4231 is disposed to have a length in a direction perpendicular to a movable pressing direction of the lever button knob 410. In this embodiment, the linear block trigger body 4231 has a '⊏'-shaped structure, but various modifications thereof can be made within a range of implementing a structure having a length in a direction intersecting or preferably perpendicular to the movable direction of the lever button knob 410.

More specifically, in this embodiment, the linear block trigger 423 includes a linear block trigger body 4231, a linear block trigger inclined part 4233, and a linear block trigger mounting part 4235.

The linear block trigger body 4231 has a '⊏'-shaped structure and its one end is disposed as a free end. The linear block trigger mounting part 4235 is disposed at a side of the linear block body 421. The linear block trigger inclined part 4233 is connected at one end thereof to the linear block trigger body 4231 and connected at the other end thereof to the linear block trigger mounting part 4235. In this embodiment, the linear block trigger mounting part 4235 has a structure in which it is disposed at the centers of both sides of the linear block body 421, and the linear block trigger body 4231 has a structure in which it is disposed at a lower position when viewed in a longitudinal direction of a segment perpendicular to the movable direction of the linear block body 421. Thus, in order to interconnect the linear block trigger mounting part 4235 and the linear block trigger body 4231, the linear block trigger inclined part 4233 is formed as a predetermined inclined arrangement structure. The shape of the linear block trigger 423 is not limited thereto, but in this embodiment, the linear block trigger body 4231 preferably has a lower-position arrangement structure to implement a predetermined operation and/or a stable movable structure without any interference with other elements which will be described later in terms of a compact configuration.

As described above, the linear block trigger body 4231 has a 'ⵧ'-shaped structure to permit a space where other elements can be moved.

The lever button holder 440 is disposed at the lever housing 100. In this embodiment, the lever button holder 440 is disposed so as to be fixed in position with respect to the lever housing 100. In addition, in this embodiment, the lever button holder 440 is formed as a separate element, but in some embodiments, the lever button holder is not formed as the separate element, and may have a structure in which it is entirely or at least partially formed integrally with the lever housing.

The lever button holder 440 performs a position fixing function to stably perform the operation of the lever button switch movement transfer part 450 which will be described below.

The lever button holder 440 includes a lever button holder body 441 and a lever button holder hanging part 443.

The lever button holder body 441 is implemented as a block structure in which it is securely fixed and mounted to the inner wall of the lever housing 100. As described above, the rotary return accommodating part 371 is formed in the lever button holder body 441 of the lever button holder 440 so that an element for performing a return function or a detent function of the lever rotary switch unit can be mounted in the rotary return accommodating part 371.

A holder body fixing part 4411 is formed on an outer side of the lever button holder body 441. In this embodiment, the holder body fixing part 4411 has a structure in which it extends outwardly from a side of the lever button holder body 441 in a direction perpendicular to a rectilinear direction where the lever button knob 410 is moved, but is not limited thereto. A fastening part mounting hole 4412 is formed in the holder body fixing part 4411, and a holder body fastening part 4413 is insertedly mounted in the fastening part mounting hole 4412 so that the lever button holder 400 can have a structure in which the lever button holder body 441 is securely fixed to the housing base 110 of the lever housing 100.

Figure 7:
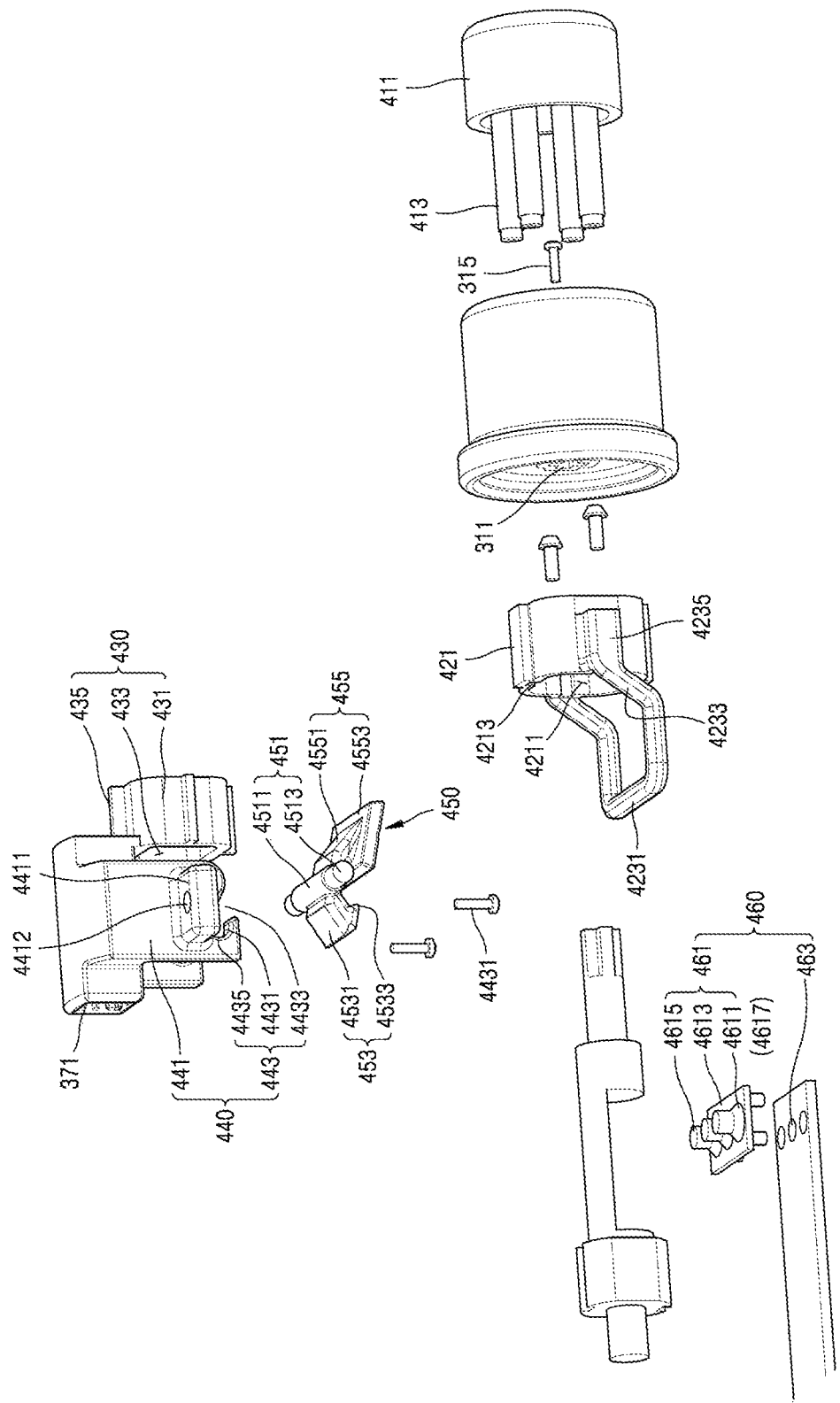
FIG. 7 is a schematic partial exploded perspective view showing a lever button switch unit of a lever type vehicular remote shift switching device according to an embodiment of the present invention.

The lever button holder hanging part 443 is disposed at a lower end of the lever button holder body 441 (see FIGS. 2 and 7). The lever button switch movement transfer part 450 which will be described later is hingedly coupled to the lever button holder hanging part 443 so that the lever button holder hanging part 443 can have a structure of permitting only a relative rotation therebetween. But in this embodiment, the lever button holder hanging part 443 has a hinge mounting structure of implementing a predetermined desired rotational operation, but not a mounting structure of maintaining only a complete insertion state, but this hinge coupling structure can be modified variously depending on design specifications.

The lever button holder hanging part 443 includes a lever button holder hanging protrusion 4431, a lever button holder hanging opening 4433, and a lever button holder hanging accommodating part 4435.

The lever button holder hanging protrusion 4431 is formed extending from a lower end of the lever button holder body 441 and partitions an at least part of the lever button holder hanging opening 4433 and the lever button holder hanging accommodating part 4435. The lever button holder hanging opening 4433 is disposed at an outer side of the lever button holder hanging protrusion 4431. In this case, the lever button holder hanging accommodating part 4435 is formed at an inner side of the lever button holder hanging protrusion 4431, and a corresponding hinge element of the lever button switch movement transfer part 450 is insertedly disposed therein to implement a rotatable structure. The lever button holder hanging opening 4433 and the lever button holder hanging accommodating part 4435 are formed inclinedly so that an unwanted escape of the lever button switch movement transfer part 450 rearwardly or downwardly through the lever button holder hanging protrusion 4431 can be prevented while restricting an excessive movement of the lever button switch movement transfer part 450 in a pressing direction of the lever button knob 410.

The lever button switch movement transfer part 450 is rotatably disposed at at least one part thereof in the lever button holder 440 and contacted at at least the other part thereof with the lever button linear block 420. In this embodiment, when the lever button linear block 420 is moved rectilinearly, the lever button switch movement transfer part 450 forms a seesaw movable structure.

The lever button switch movement transfer part 450 includes a lever button switch movement transfer hinge 451, a lever button switch movement transfer trigger contact part 453, and a lever button switch movement transfer trigger moving part 455.

The lever button switch movement transfer hinge 451 of the present invention is rotatably coupled to the lever button holder 440. The lever button switch movement transfer hinge 451 includes a lever button switch movement transfer hinge body 4511 and a lever button switch movement transfer hinge end 4513. The lever button switch movement transfer hinge body 4511 is implemented as a rod type structure having a length intersecting a pressing direction of the lever button knob 410, more specifically a direction perpendicular to the pressing direction.

The lever button switch movement transfer hinge body 4511 has a predetermined length and the lever button switch movement transfer trigger contact part 453 and the lever button switch movement transfer trigger moving part 455 are disposed at both outer sides thereof. The lever button switch movement transfer hinge body 4511 may be formed integrally with the lever button switch movement transfer trigger contact part 453 and the lever button switch movement transfer trigger moving part 455.

The lever button switch movement transfer hinge end 4513 is disposed at both ends of the lever button switch movement transfer hinge body 4511 and has a radius smaller than that of the switch movement transfer hinge body 4511 in this embodiment.

The lever button switch movement transfer hinge end 4513 enters the lever button holder 440 through the lever button holder hanging opening 4433 and is rotatably accommodated in the lever button holder hanging accommodating part 4435.

The lever button switch movement transfer trigger contact part 453 is disposed at one side of an outer circumference of the lever button switch movement transfer hinge 451, more specifically at one side of the lever button switch movement transfer hinge body 4511. The lever button switch movement transfer trigger contact part 453 is contactable with lever button linear block 420.

The lever button switch movement transfer trigger contact part 453 includes a lever button switch movement transfer trigger contact body 4531 and a lever button switch movement transfer trigger contact hook 4533.

The lever button switch movement transfer trigger contact body 4531 is connected to the lever button switch movement transfer hinge 451 in such a manner as to extend outwardly from the lever button switch movement transfer hinge 451. In this case, the lever button switch movement transfer trigger contact body 4531 is configured to form a preset angle with the lever button switch movement transfer trigger moving part 455 relative to the lever button switch movement transfer hinge 451. In this embodiment, the lever button switch movement transfer trigger contact part 453 and the lever button switch movement transfer trigger moving part 455 are disposed to form a '人'-shape relative to the lever button switch movement transfer hinge 451.

The lever button switch movement transfer trigger contact hook 4533 is formed extending outwardly from an end of the lever button switch movement transfer trigger contact body 4531. In other words, the lever button switch movement transfer trigger contact hook 4533 is disposed extending toward the lever button switch movement transfer hinge 451 when projected onto a plane including a rectilinear direction where the lever button linear block 420 is moved. In other words, when viewed from above the drawing sheets of FIGS. 4 and 8, the lever button switch movement transfer trigger contact hook 4533 is formed extending in the longitudinal direction of the lever button switch movement transfer trigger contact body 4531, i.e., in an opposite direction to a left direction on the drawing sheet, i.e., in a right direction on the drawing sheet. In addition, the lever button switch movement transfer trigger contact hook 4533 forms an engagement contact state with the linear block trigger body 4231 to transfer a pressing and moving force of the lever button knob 410 through the linear block trigger body 4231.

Figure 8:
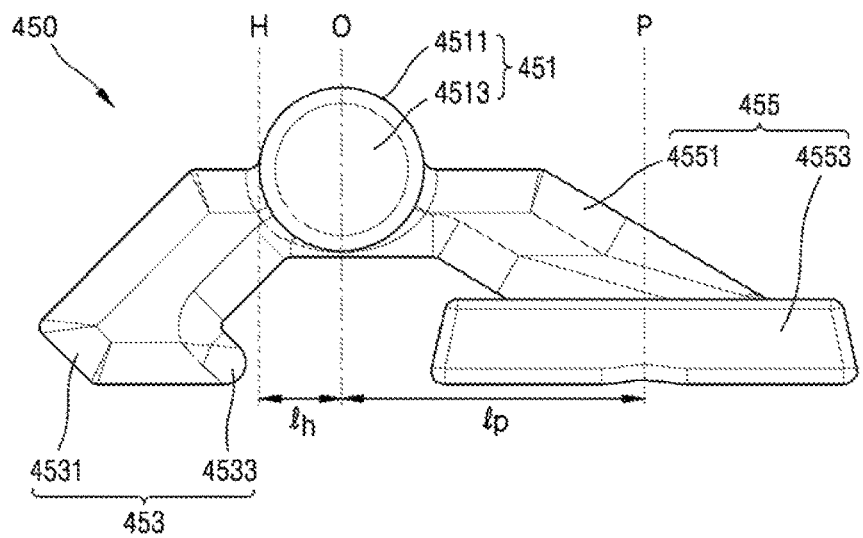
FIG. 8 is a schematic partial side view showing a lever button switch movement transferring part of a lever button switch unit of a lever type vehicular remote shift switching device according to an embodiment of the present invention.

More specifically, as shown in FIG. 8, when projected onto a plane including a rectilinear direction where the lever button linear block 42 is moved, a geometrical structure relationship is established between the lever button switch movement transfer hinge 451 including the lever button switch movement transfer hinge body 4511 and the lever button switch movement transfer hinge end 4513 and the lever button switch movement transfer trigger contact hook 4533/the lever button switch movement transfer trigger moving part 455. When a distance between the lever button switch movement transfer trigger contact hook 4533 and the lever button switch movement transfer hinge 451 is denoted by a reference symbol "lh", and a distance between a position of the lever button switch movement transfer trigger moving part 455, where the lever button switch 460 is operated and the lever button switch movement transfer hinge 451 is denoted by a reference symbol "lp", the distance (lh) between the lever button switch movement transfer trigger contact hook 4533 or an acting point (H) of the lever button switch movement transfer trigger contact hook 4533 and the lever button switch movement transfer hinge 451, and the distance (lp) between a position (P) where the lever button switch movement transfer trigger moving part 455, where the lever button switch 460 is operated and the lever button switch movement transfer hinge 451 form a preset distance ratio (Rph=lp/lh). The preset distance ratio (Rph=lp/lh) preferably has a value greater than or equal to 1. By virtue of this configuration, when a pressing and moving force is transferred to the lever button switch movement transfer trigger contact hook 4533 through the linear block trigger body 4231, the same rotational displacement occurs relative to the lever button switch movement transfer hinge 451. In addition, the lever button switch movement transfer trigger moving part 455 causes a larger rectilinear displacement due to the preset distance ratio (Rph=lp/lh) of 1 or more, i.e., a larger radius of gyration so that a more accurate change in the operating state can be detected.

The lever button switch movement transfer trigger moving part 455 is disposed at the other side of the outer circumference of the lever button switch movement transfer hinge 451, and can operate the lever button switch 460. More specifically, the lever button switch movement transfer trigger moving part 455 is pivotally rotated about the lever button switch movement transfer hinge 451 when the lever button switch movement transfer trigger contact part 453 is moved by the lever button linear block 420, so that the lever button switch 460 can be operated. The lever button switch movement transfer trigger moving part 455 includes a transfer trigger moving body 4551 and a transfer trigger moving base 4553.

The transfer trigger moving body 4551 is disposed at the other side of the outer circumference of the lever button switch movement transfer hinge 451. The transfer trigger moving body 4551 is formed extending in an opposite direction to the pressing direction of the lever button knob 410, i.e., in a rightward and downward direction in FIG. 8.

The transfer trigger moving base 4553 is disposed at an end of the transfer trigger moving body 4551. The transfer trigger moving base 4553 has a cross-sectional area larger than that of the transfer trigger moving body 4551 so that a more smooth operation can be implemented compared to the case where the transfer trigger moving base 4553 operates the lever button switch 460.

The transfer trigger moving base 4553 has a transfer trigger moving base recess 4555 formed on the underside thereof. The transfer trigger moving base recess 4555 is an accommodating recess formed in the shape of a recess concaved from the underside of the transfer trigger moving base 4553. Thus, transfer trigger moving base recess 4555 can achieve a stable contact structure with the lever button switch 460.

The lever button switch 460 is disposed to be contactable with the lever button switch movement transfer part 450 so as to generate an electrical signal or a change in the electrical signal by the lever button switch movement transfer part 450. The lever button switch 460 may include a contact type switch such as a rubber pad switch, a tact switch or the like, and a non-contact type switch such as a magnetic switch, a hall sensor switch or the like. In this embodiment, a description will be made centering on the case where the lever button switch 460 is implemented as the rubber pad switch.

The lever button switch 460 includes a lever button switch moving part 461 and a lever button switch fixing part 463. The lever button switch moving part 461 includes a lever button switch moving elastic part 4611 and a lever button switch moving contact point 4613. The lever button switch moving elastic part 4611 includes a lever button switch moving elastic base 46111, a lever button switch moving elastic support 46113, and a lever button switch moving elastic contact 46115. The lever button switch moving elastic part 4611 may be implemented as a rubber pad, but it is implemented as a simple rubber pad switch in this embodiment.

The lever button switch moving elastic base 46111 is disposed on one surface of the lever substrate 200 so as to be fixed in position with respect to the lever substrate 200, and the lever button switch moving elastic support 46113 is formed extending from lever button switch moving elastic base 46111 in an elastically deformable manner. The lever button switch moving elastic contact 46115 is connected to the lever button switch moving elastic support 46113. The lever button switch moving elastic contact 46115 is brought into close contact with the transfer trigger moving base recess 4555 of the lever button switch movement transfer part 450 to receive a pressing and moving force or elastically support the lever button switch movement transfer part 450 when an external force applied to the lever button knob 410 is removed.

The lever button switch moving contact point 4613 is disposed on the underside surface of the lever button switch moving elastic contact 46115. The lever button switch fixing part 463 is formed on one surface of the lever substrate 200 to correspond to a position of the lever button switch moving contact point 4613. When the lever button switch moving elastic contact 46115 is brought into close contact with the transfer trigger moving base recess 4555 of the lever button switch movement transfer part 450 to receive a pressing and moving force, there occurs a change in the contact state between the lever button switch moving contact point 4613 disposed on the underside of the lever button switch moving elastic contact 46115 and the lever button switch fixing part 463 so that a change in a certain electrical signal can be caused.

Also, in the meantime, the lever button switch unit 400 may further include a guide element configured to implement a button switching operation thereof in a more natural and stable manner. In other words, the lever button switch unit 400 may further include the lever button linear block guide 430 disposed so as to be at least partially fixed in position with respect to the lever substrate 200, and configured to guide the movement of the lever button linear block 420.

More specifically, in this embodiment, the lever button linear block guide 430 of the lever button switch unit 400 can be disposed so as to be fixed in position with respect to the lever button holder 440 disposed so as to be fixed in position with respect to the lever housing 100. In this embodiment, the lever button linear block guide 430 includes a linear block guide body 431, and may further include a linear block guide line 435 in some embodiments.

First, the linear block guide body 431 is disposed so as to be fixed in position with respect to the lever housing 100 and is engaged with the lever button linear block 420 to enable a relative movement between the linear block guide body 431 and the lever button linear block 420. The linear block guide body 431 is formed as a structure in which it is movably accommodated in the linear block body accommodating part 4211 formed in the linear block body 421 of the lever button linear block 420. Although it has been illustrated in this embodiment that the lever button linear block 420 has an accommodating structure and the lever button linear block guide 430 has a protruding structure, the lever button linear block 420 and the lever button linear block guide 430 may have an opposite configuration to the above configuration in some embodiments.

The linear block guide body 431 has a linear block guide body through-hole 433 formed therein so that the linear block guide body 431 achieves an penetrating structure through the through-hole 433.

In the meantime, the linear block guide line 435 is formed on the linear block guide body 431 in a relative movement direction of the lever button linear block 420. In addition, the lever button linear block 420 includes a linear block body accommodating guide 4213 formed thereon to correspond to a position of the linear block guide line 435 so as to be engageable with the linear block guide line 435. A relative movement between the linear block guide body 431 and the lever button linear block 420 can be performed smoothly through a relative movable engagement between the linear block guide line 435 and the linear block body accommodating guide 4213.

In this embodiment, in the case where the lever button linear block 420 has an accommodating structure and the lever button linear block guide 430 has a protruding structure, the linear block guide line 435 is formed on an outer circumference of the linear block guide body 431, and the linear block body accommodating guide 4213 is formed on an inner circumferential surface of the linear block body accommodating part 4211 of the linear block body 421 of the lever button linear block 420 to correspond to the linear block guide line 435.

Figure 9:
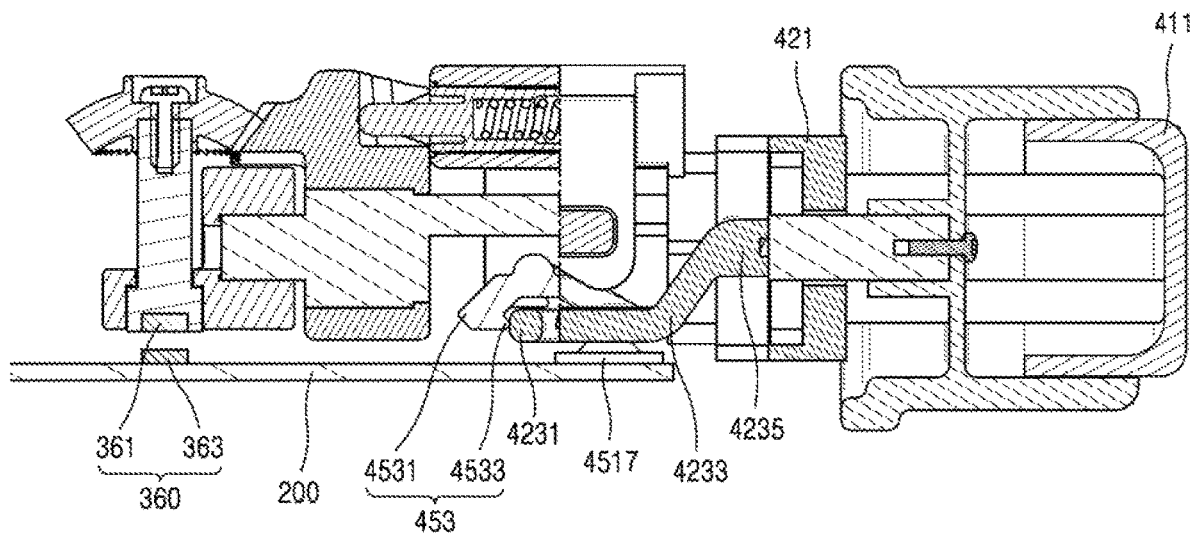
FIG. 9 is a schematic partial side cross-sectional view showing the operation state of a lever type vehicular remote shift switching device according to an embodiment of the present invention.
Figure 10:
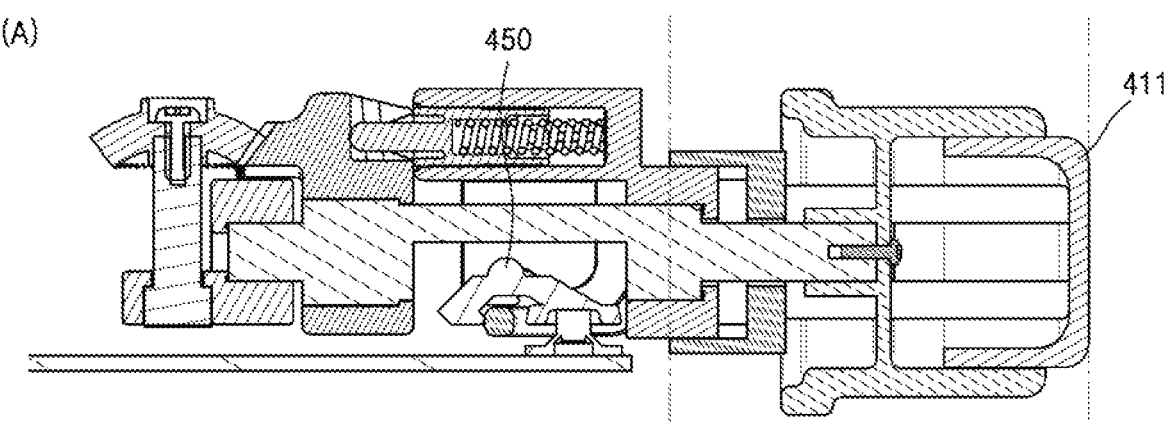
FIG. 10 is a schematic partial side cross-sectional view showing the operation state of a lever button switch unit of a lever type vehicular remote shift switching device according to an embodiment of the present invention.
Figure 10:
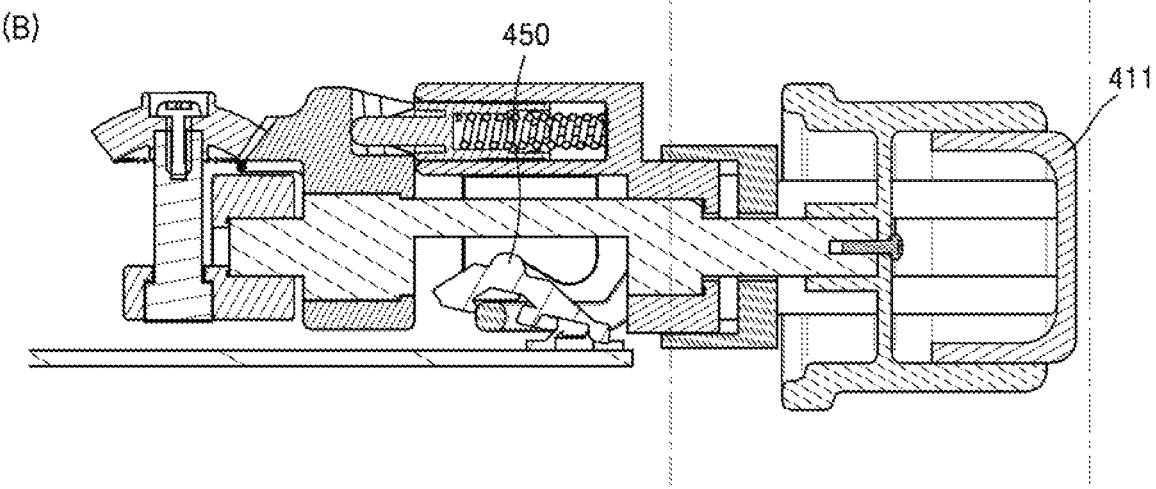
Figure 11:
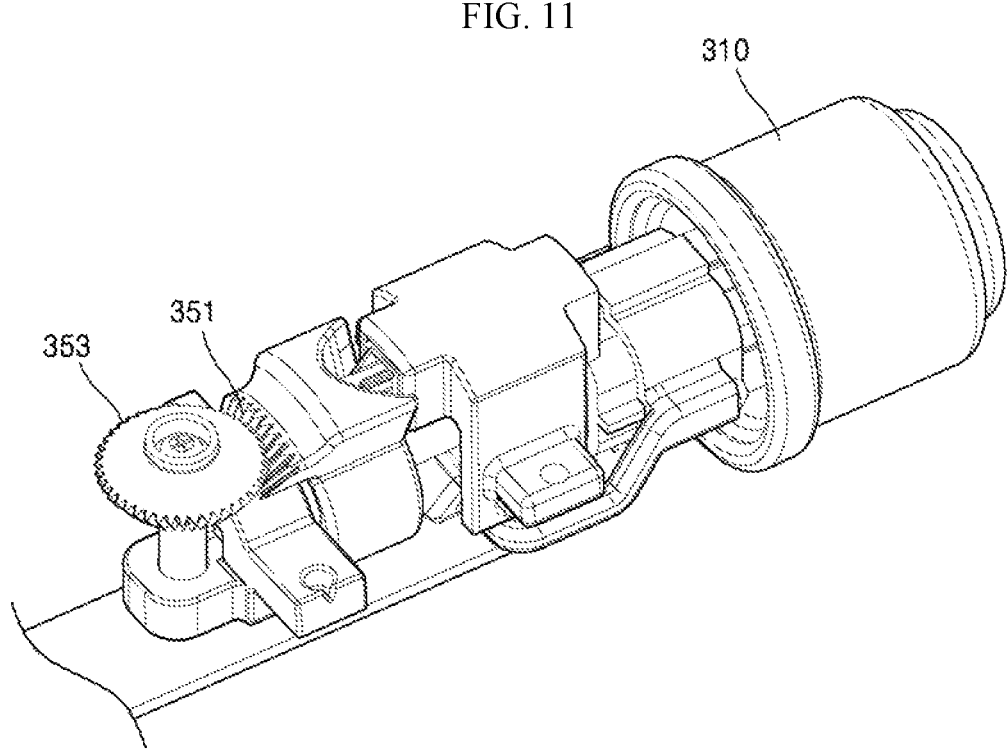
FIG. 11 is a schematic perspective view showing the operation state of a lever rotary switch unit of a lever type vehicular remote shift switching device according to an embodiment of the present invention.
Figure 12:
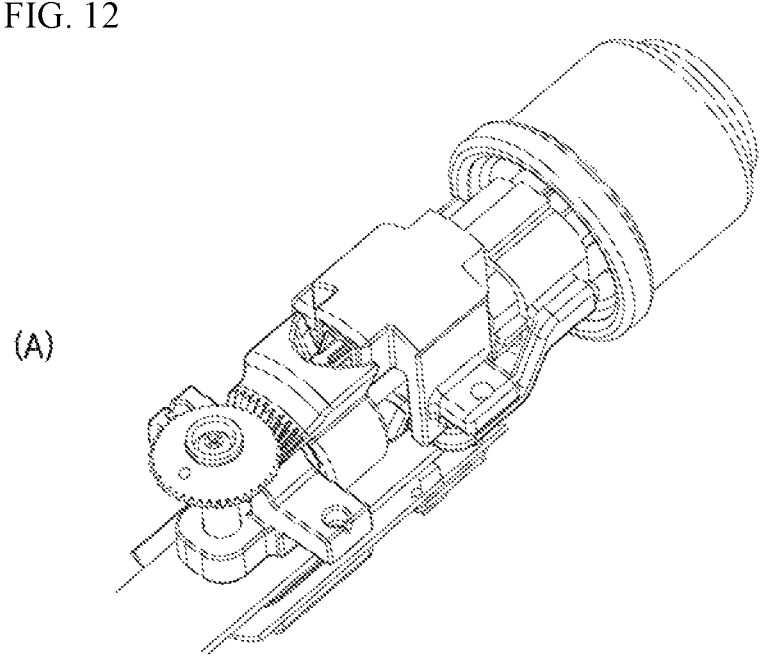
FIGS. 12 to 14 are schematic partial perspective and top plan views showing the non-operation/one-directional operation/the other directional operation states of a lever rotary switch unit of a lever type vehicular remote shift switching device according to an embodiment of the present invention.
Figure 12:
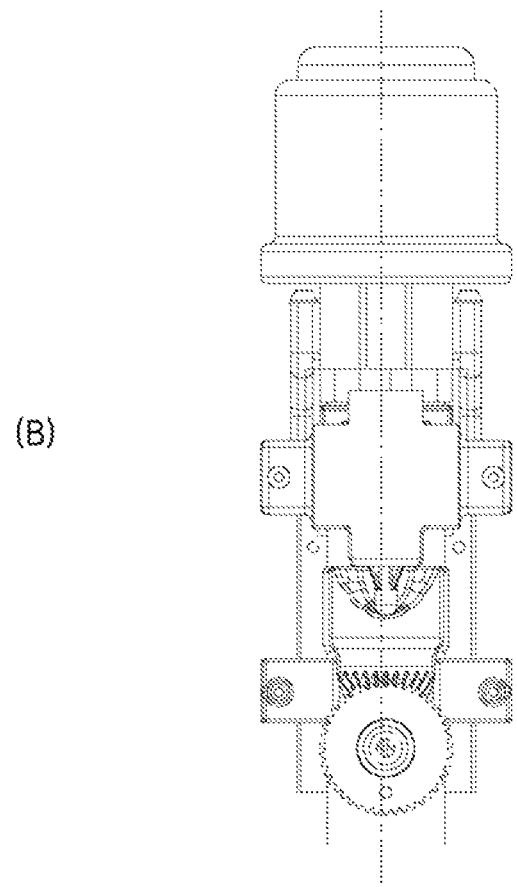
Figure 13:
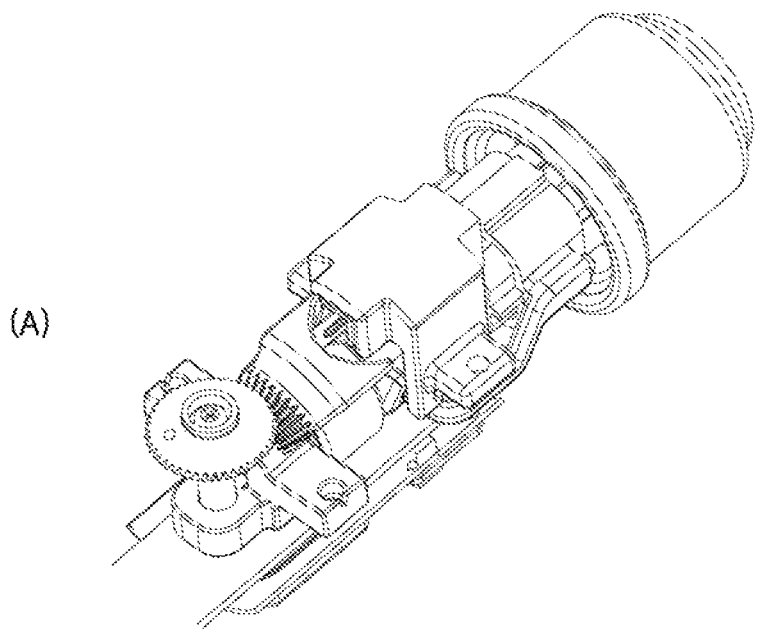
Figure 13:
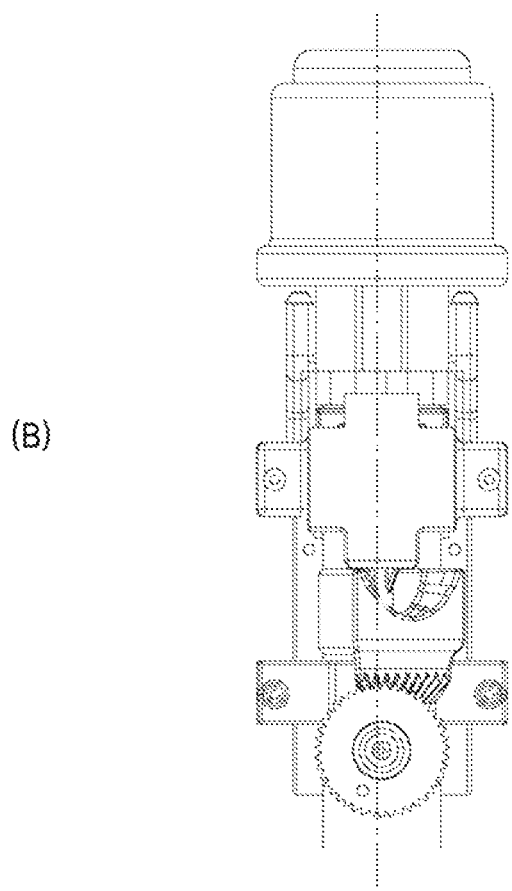
Figure 14:
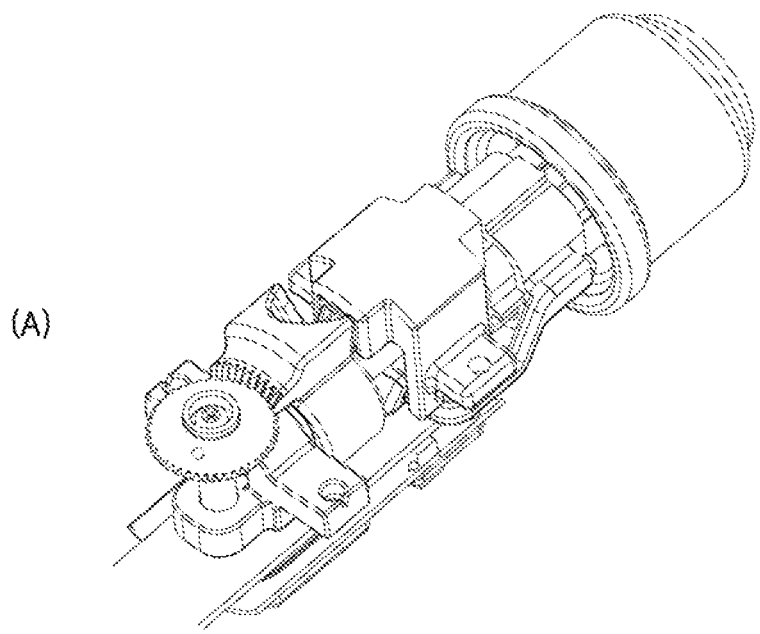
Figure 14:
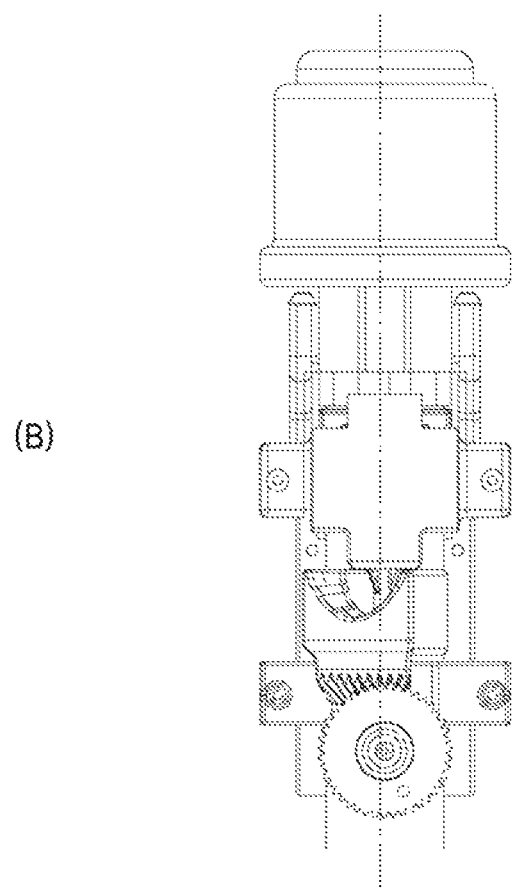

FIG. 9 and FIGS. 10(*a*) and 10(*b*) show the operating process of the lever button switch unit 400 according to an embodiment of the present invention. First, when a user presses the lever button knob body 411 of the lever button knob 410, the linear block body 421 of the lever button linear block 420 connected to the lever button knob body 411 is moved rectilinearly and the linear block trigger 423 connected to the linear block body 421 causes the movement of the lever button switch movement transfer part 450 to perform a predetermined hinge operation. This operation rotates the ever button switch movement transfer trigger contact part 453 of the lever button switch movement transfer part 450 to press the lever button switch 460 to generate a certain signal change, which is in turn applied to an external device such as a control unit (not shown).

As described above, the lever type vehicular remote shift switching device of the present invention may further include a push switch unit 500 and/or an indicator 600. In other words, the push switch unit 500 includes a push switch knob 530, a push switch plunger 510, a push switch rubber elastic part 520, a push switch moving part 523, and a push switch fixing part 525. The push switch knob 530 is disposed so as to be exposed to the outside by being penetrated through the cover shaft button through-opening 124, and the push switch plunger 510 is disposed at a corresponding position of the push switch knob 530. The push switch plunger 510 is disposed so as to pass through a medium through-hole 131 and press the push switch rubber elastic part 520. The push switch rubber elastic part 520 is deformed by being pressed to generate a predetermined switch signal change through a persistent or intermittent contact between the push switch moving part 523 disposed inwardly of the push switch rubber elastic part 520 and the push switch fixing part 525 disposed on the lever substrate 200 to correspond thereto, so that the transfer of the signal to the control unit (not shown) can be achieved. In this embodiment, the push switch unit is implemented as a P release switch that performs the release of the P range, but the operation performed by the push switch unit can be modified in various manners depending on design specifications.

Moreover, the indicator 600 includes an indicator cover 610, a light transferring part 620, and a light source 630. The indicator cover 610 is disposed at the cover shaft indicator through-opening 126 and the light transferring part 620 is disposed within the lever housing 100 to correspond to the indicator cover 610. The light transferring part 620 may be disposed through the medium through-hole 131 of the housing medium 130. The light source 630 may be implemented as an optical element such as an LED. Light exiting the light source 630 is transferred to the outside through the light transferring part 620 and the indicator cover 610 to enable a user to recognize a selection mode through a current operation of the lever rotary switch unit and the lever button switch unit. In this embodiment, the indicator is used to indicate a shift range selected by the user, but can be modified variously.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A lever type vehicular remote shift switching device configured to be disposed at a side of a steering wheel connected to a steering shaft of a vehicle, the switching device comprising:
    a lever housing (100) disposed at the steering shaft;
    a lever substrate (200) disposed within the lever housing (100);
    a lever rotary switch unit (300) at least partially rotatably disposed at an end of the lever housing (100) and comprising a rotary switch part (360) disposed on the lever substrate (200);
    a lever button switch unit (400) at least partially disposed at an end of the lever rotary switch unit (300) in a movable pressing manner, and including a lever button switch (460) at least partially disposed on the lever substrate (200), wherein
    the lever button switch unit (400) is at least partially disposed in the longitudinal direction of the lever housing (100) so as to pass through an at least part of the lever rotary switch unit (300),
    wherein the lever rotary switch unit (300) comprises:
        a rotary knob (310) disposed to be rotatable about an axis in a longitudinal direction of the lever housing (100);
        a rotary shaft housing support (340) securely fixed to the inside of the lever housing (100);
        a rotary shaft (320) connected at one end thereof to the rotary knob (310), and rotatably disposed at the other end thereof in the rotary shaft housing support (340) so as to rotate together with the rotary knob (310);
        a rotary block (330) disposed on an outer circumferential surface of the rotary shaft (320) at the rotary shaft housing support (340) and configured to axially rotate together with the rotary shaft (320);
        a rotary transfer part (350) disposed within the lever housing (100) at least partially together with an end of the rotary block (330) and configured to transfer the rotation of the rotary block (330); and
        the rotary switch part (360) comprising a rotary switch moving part (361) disposed at the rotary transfer part (350) so as to be moved together with the rotary transfer part (350) in response to the movement of the rotary transfer part (350), and a rotary switch fixing part (363) disposed on the lever substrate (200) to correspond to the rotary switch moving part (361) and configured to generate an electric signal changed depending on the rotation of the rotary switch moving part (361), and
    wherein the rotary shaft (320) comprises:
        a rotary shaft support (321) disposed at one end of the rotary shaft (320) so as to be rotatably inserted into the rotary shaft housing support (340);
        a rotary shaft coupling part (326) rotatably coupled to the rotary knob (310);
        a rotary shaft body (325) disposed between the rotary shaft support (321) and the rotary shaft coupling part (326); and
        a rotary shaft block mounting part (323) disposed between the rotary shaft body (325) and the rotary shaft support (321) so as to allow the rotary block (330) to be disposed on an outer circumferential surface thereof.

2. The lever type vehicular remote shift switching device according to claim 1, wherein the rotary block (330) comprises:
    a rotary block body (331) including a rotary block body mounting part (332) engageable with the outer circumferential surface of the rotary shaft block mounting part (323); and
    a rotary block body extension part (333) disposed on an outer circumferential surface of the rotary block body (331) so as to allow the rotary transfer part (350) to be at least partially disposed at at least one end thereof.

3. The lever type vehicular remote shift switching device according to claim 2, wherein the rotary block body mounting part (332) is formed as a through-hole structure,
    wherein the rotary shaft block mounting part (323) includes a rotary shaft block mounting guide (324) formed on an outer circumferential surface thereof, and
    wherein the rotary block body (331) includes a rotary block body guide (3311) formed on an inner circumferential surface thereof so as to be engageable with the rotary shaft block mounting guide (324).

4. The lever type vehicular remote shift switching device according to claim 1, wherein the rotary shaft body (325) includes a rotary shaft body incised part (3251) formed on an outer circumferential surface thereof so as to prevent an interference with an at least part of the lever button switch unit (400).

5. The lever type vehicular remote shift switching device according to claim 1, wherein the rotary switch part (360) is a non-contact switch.

6. The lever type vehicular remote shift switching device according to claim 5, wherein the rotary switch moving part (361) is a magnet, and the rotary switch fixing part (363) is a magnetic sensor disposed on the lever substrate (200).

7. The lever type vehicular remote shift switching device according to claim 1, wherein the lever rotary switch unit (300) further comprises a rotary return part (370) configured to allow the rotary shaft (320) and the rotary block (330) to return to their original positions when an external force applied to the rotary knob (310) is removed.

8. The lever type vehicular remote shift switching device according to claim 7, wherein the rotary return part (370) comprises:
    a rotary return accommodating part (371) configured to be disposed so as to be fixed in position with respect to the lever housing (100);
    a rotary return detent block (375) at least partially movably accommodated in the rotary return accommodating part (371);
    a rotary return elastic part (373) contacted at one thereof with the inside of the rotary return accommodating part (371) and contacted at the other end thereof with one end of the rotary return detent block (375) so as to elastically support the rotary return detent block (375); and
    a rotary return detent (377) disposed at the rotary block (330) and configured to maintain a constant contact state with the other end of the rotary return detent block (375).

9. A lever type vehicular remote shift switching device configured to be disposed at a side of a steering wheel connected to a steering shaft of a vehicle, the switching device comprising:
- a lever housing (100) disposed at the steering shaft;
- a lever substrate (200) disposed within the lever housing (100);
- a lever rotary switch unit (300) at least partially rotatably disposed at an end of the lever housing (100) and comprising a rotary switch part (360) disposed on the lever substrate (200);
- a lever button switch unit (400) at least partially disposed at an end of the lever rotary switch unit (300) in a movable pressing manner, and including a lever button switch (460) at least partially disposed on the lever substrate (200), wherein the lever button switch unit (400) is at least partially disposed in the longitudinal direction of the lever housing (100) so as to pass through an at least part of the lever rotary switch unit (300), and wherein the lever rotary switch unit (300) comprises:
- a rotary knob (310) disposed to be rotatable about an axis in a longitudinal direction of the lever housing (100);
- a rotary shaft housing support (340) securely fixed to the inside of the lever housing (100);
- a rotary shaft (320) connected at one end thereof to the rotary knob (310), and rotatably disposed at the other end thereof in the rotary shaft housing support (340) so as to rotate together with the rotary knob (310);
- a rotary block (330) disposed on an outer circumferential surface of the rotary shaft (320) at the rotary shaft housing support (340) and configured to axially rotate together with the rotary shaft (320);
- a rotary transfer part (350) disposed within the lever housing (100) at least partially together with an end of the rotary block (330) and configured to transfer the rotation of the rotary block (330); and
- the rotary switch part (360) comprising a rotary switch moving part (361) disposed at the rotary transfer part (350) so as to be moved together with the rotary transfer part (350) in response to the movement of the rotary transfer part (350), and a rotary switch fixing part (363) disposed on the lever substrate (200) to correspond to the rotary switch moving part (361) and configured to generate an electric signal changed depending on the rotation of the rotary switch moving part (361), and wherein the rotary transfer part (350) comprises:
- a rotary transfer driving part (351) connected to the rotary block (330) so as to be rotated together with the rotary block (330);
- a rotary transfer driven part (353) operated in cooperation with the rotary transfer driving part (351) so as to receive a rotational driving force from the rotary transfer driving part (351); and
- a rotary transfer shaft (355) connected to the rotary transfer driven part (353) so as to perform an equiangular rotation together with the rotary transfer driven part (353).

10. The lever type vehicular remote shift switching device according to claim 9, wherein the rotary transfer shaft (355) comprises:
- a rotary transfer shaft body (3551) formed extending in the longitudinal direction of a rotational center axis of the rotary transfer driven part (353);
- a rotary transfer shaft coupling part (3553) disposed at one end of the rotary transfer shaft body (3551) so as to be connected to the rotary transfer driven part (353); and
- a sensor mounting part (3555) disposed at the other end of the rotary transfer shaft body (3551) so as to allow the rotary switch part (360) to be at least partially disposed therein.

11. The lever type vehicular remote shift switching device according to claim 9, further comprising a rotary transfer shaft holding part (357) disposed so as to be fixed in position with respect to the lever housing (100) so as to guide the rotation of the rotary transfer shaft (355).

12. The lever type vehicular remote shift switching device according to claim 11, wherein when projected onto a plane including the segments extending in the longitudinal direction of the rotary shaft (320) and the rotary transfer shaft (355), the segments intersect each other.

13. The lever type vehicular remote shift switching device according to claim 9, wherein the rotary transfer driving part (351) and the rotary transfer driven part (353) form a gear engagement structure in which they are meshedly engaged with each other.

14. The lever type vehicular remote shift switching device according to claim 13, wherein the rotary transfer driving part (351) and the rotary transfer driven part (353) form a gear engagement structure in which a rotational axis of the rotary transfer driving part (351) and a rotational axis of rotary transfer driven part (353) are disposed to intersect each other at right angles.

* * * * *